US011544889B2

(12) United States Patent
Nordberg

(10) Patent No.: US 11,544,889 B2
(45) Date of Patent: Jan. 3, 2023

(54) SYSTEM AND METHOD FOR GENERATING AN ANIMATION FROM A TEMPLATE

(71) Applicant: Trygve Austin Nordberg, Columbia Heights, MN (US)

(72) Inventor: Trygve Austin Nordberg, Columbia Heights, MN (US)

(*) Notice: Subject to any disclaimer, the term of this patent is extended or adjusted under 35 U.S.C. 154(b) by 0 days.

(21) Appl. No.: 17/346,968

(22) Filed: Jun. 14, 2021

(65) Prior Publication Data
US 2022/0044466 A1   Feb. 10, 2022

Related U.S. Application Data

(60) Provisional application No. 63/038,840, filed on Jun. 14, 2020.

(51) Int. Cl.
*G06T 13/80* (2011.01)

(52) U.S. Cl.
CPC .................... *G06T 13/80* (2013.01)

(58) Field of Classification Search
None
See application file for complete search history.

(56) References Cited

U.S. PATENT DOCUMENTS

| 7,496,856 | B2 | 2/2009 | Beezer et al. |
| 8,350,858 | B1* | 1/2013 | Ranganathan .......... G06T 15/80 345/473 |
| 9,355,487 | B2 | 5/2016 | Moll et al. |
| 9,681,016 | B2 | 6/2017 | Arputharaj et al. |
| 9,754,399 | B2 | 9/2017 | Moll et al. |
| 9,946,448 | B2 | 4/2018 | Moll et al. |
| 10,475,226 | B2 | 11/2019 | Moll et al. |
| 2014/0267303 | A1* | 9/2014 | Larkin .................. G06T 13/80 345/473 |
| 2015/0302628 | A1* | 10/2015 | Ye ...................... G06F 3/04847 715/721 |
| 2015/0331888 | A1 | 11/2015 | Shomair |
| 2018/0047209 | A1* | 2/2018 | Funami ............. H04N 1/19594 |

* cited by examiner

*Primary Examiner* — Jeffrey J Chow
(74) *Attorney, Agent, or Firm* — Mitchell Hamline IP Clinic

(57) ABSTRACT

A system for creating an animation may include a template adapted for receiving animation content from a user and configured to guide the user in providing animation content. The system may also include a computing system configured to receive an image of a completed version of the template and generate an animation based on the completed template. The system may allow for generating an animation from a single image by identifying and extracting particular regions of the image and using their spatial relationship to sequence the regions in time rather than space.

19 Claims, 37 Drawing Sheets

SYSTEM AND METHOD FOR GENERATING AN ANIMATION FROM A TEMPLATE

CROSS-REFERENCE TO RELATED APPLICATIONS

The present application claims priority to U.S. Provisional Application No. 63/038,840 entitled Systems, Methods, Software, and Components for Compositing and Compiling Hand-Drawn Visual Markings into Animated Sequences and filed on Jun. 14, 2020, the content of which is hereby incorporated by reference herein in its entirety.

FIELD

The present disclosure pertains to templates, systems, and methods for generating animation content. More particularly, the present application relates to templates adapted for guiding the depiction of animation content, capturing the content, and generating an animation.

BACKGROUND

Digital animation is achieved by creating a series of images and compiling them into an animated sequence to form a video file. The length of video files can be controlled by the number of images that are compiled together and the rate at which the images are displayed in frames per second. A video file will have a longer length in time if the display rate has fewer frames per second, but the motion displayed in the video file will not appear as continuous to the observer.

Digital animation generally includes producing images that are created by some medium and compiled by hand or by a computing device. After a digital animation is compiled, the user may produce the animation by rapidly displaying the images in a desired sequence to simulate a desired change from one image to the next. This can be displayed by a user by viewing one image at a time in succession or by a computing device that displays each image in a desired order and at a desired display rate. Existing systems and methods fail to provide a simple approach to capturing and compiling so that unsophisticated users can prepare animations. There are few teaching tools and formats used for animation are not commonly used by the general public preventing receipt, viewing, and sharing by the average individual.

BRIEF SUMMARY

In one or more embodiments, an animation template may include a substrate configured for receiving animation content from a user. The template may also include a foundation arranged on the substrate and defining a series of juxtaposed positions configured to guide a user in the spatial placement of the animation content. The template may also include a template information feature arranged on the substrate and configured for providing template information to a computing system.

In one or more embodiments, a method of creating an animation may include receiving or selecting a template having a series of juxtaposed positions for receiving animation content. The method may also include providing animation content in the series of juxtaposed positions and capturing an image of the template. The method may also include directing processing of the image to generate an animation and running and viewing the resulting animation.

In one or more embodiments, a computing system may be provided for generating an animation. The computing system may include an input component for receiving an image including animation content arranged in a series of positions on a substrate. The computing system may also include an identifier detector configured for identifying a relevant portion of an image for generating an animation. The computing system may also include an extractor configured for parsing the image into individual files, each file containing respective portions of the animation content. The computing system may also include a compiler configured for generating an animation from the individual files.

In one or more embodiments, a method for creating an animation may include receiving an image including animation content arranged in a series of positions on a substrate. The method may also include detecting a relevant portion of the image for generating an animation and extracting individual portions of the image into individual files. Each file may contain respective portions of the animation content. The method may also include generating an animation from the individual files and outputting the animation.

In one or more embodiments, a method for creating an animation may include receiving an image of a template, the template having a foundation defining a series of juxtaposed positions having content therein. The method may also include detecting an identifier within the image using an identifier detector and using the identifier to define a boundary of a portion of the image to be used to generate an animation. The method may also include processing the image with a compiler, to compile an animation and outputting the compiled animation.

In one or more embodiments may include a method for teaching a user to produce an animation may include providing a pupil with an animation template comprising a foundation defining a series of juxtaposed positions on a substrate. The series of juxtaposed positions may have guidance content therein that defines a level of artistic freedom. The method may also include instructing the pupil to augment the guidance content and instructing the pupil to direct processing of the image. The method may include instructing the pupil to repeat the above steps using a template having a higher level of artistic freedom.

In one or more embodiments, a booklet for teaching animation may include a plurality of animation templates. Each template may include a foundation defining a series of juxtaposed positions configured to receive animation content. A portion of the templates of the plurality of templates may include guidance content in the series of juxtaposed positions. The guidance content may provide a level of artistic freedom to the user and the plurality of templates are arranged in an order based on increasing levels of artistic freedom.

In one or more embodiments, a system for creating an animation may include a template adapted for receiving animation content from a user and configured to guide the user in providing animation content. The system may also include a computing system configured to receive an image of a completed version of the template and generate an animation based on the completed template.

DETAILED DESCRIPTION

Figure 1:
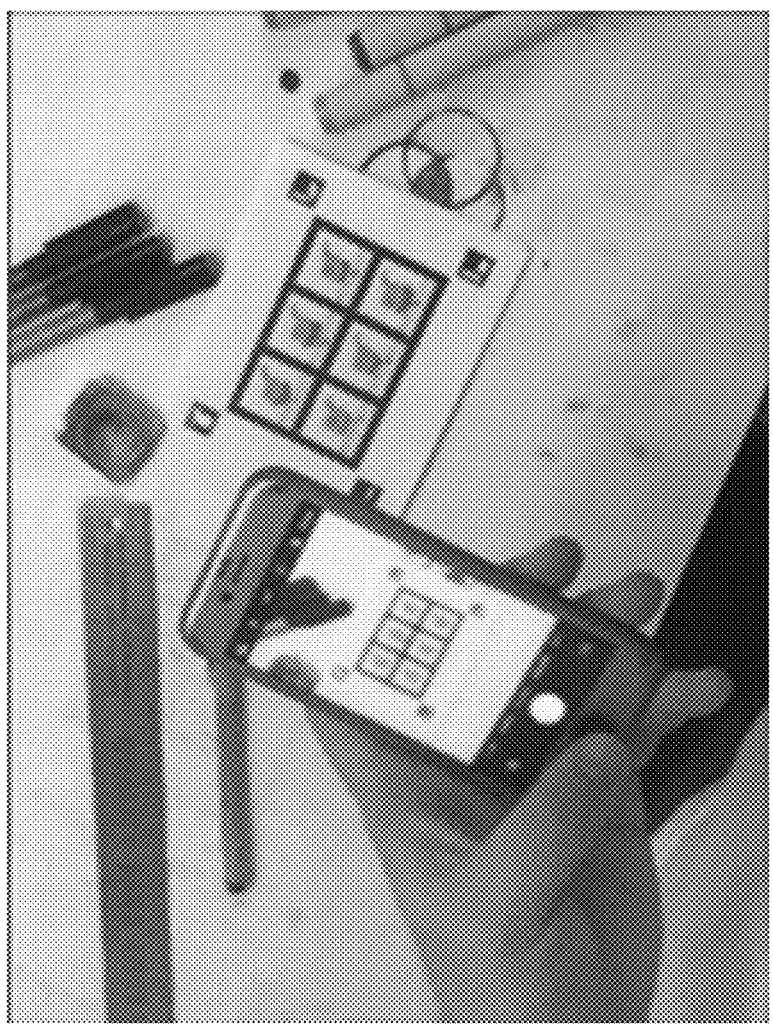
FIG. 1 is a perspective view of a user capturing an image of an animation template, according to one or more embodiments.

The present disclosure, in one or more embodiments, pertains to a template and a supporting computing system for creating digital animations from drawings made by a user. For example, drawings may be made on a variety of drawing templates that provide varying levels of guidance to a user. Such varying levels of guidance may relate to the drawings themselves or the details of the desired animation. Moreover, the varying levels of guidance may be in the form of lessons allowing for increasing levels of artistic freedom and may provide a teaching tool. The computing system may provide a way for a user to capture their creation and generate an animation. For example, the computing system may be in the form of desktop or laptop software, a smartphone app, and/or a server that receives sms or text messages with a photo of a completed template attached. Any of these computing systems may create an animation file and provide the animation and/or file to the user. The template and supporting computing system may provide an opportunity for unsophisticated users without access to sophisticated animation equipment to create original animation sequences in common transferable file formats. For example, while a professional animator may use the present tools and computing system, an untrained child or adult or any individual interested in learning how to create animation sequences may utilize the present system and generate animations in a common file format such as a GIF file, an mp4 or other video file, or other files for storing video. FIG. 1 shows an example completed template that is being photographed by a user using a smartphone. The user may text the image to a server and receive a text back with a video file or other animation file allowing them to quickly see the result of their animation effort. In other cases, the smartphone may upload the image to a website or have processing software stored on the smartphone, which may process and present the animation. The presently disclosed tools and systems may allow doodlers to become animation artists.

Figure 2:
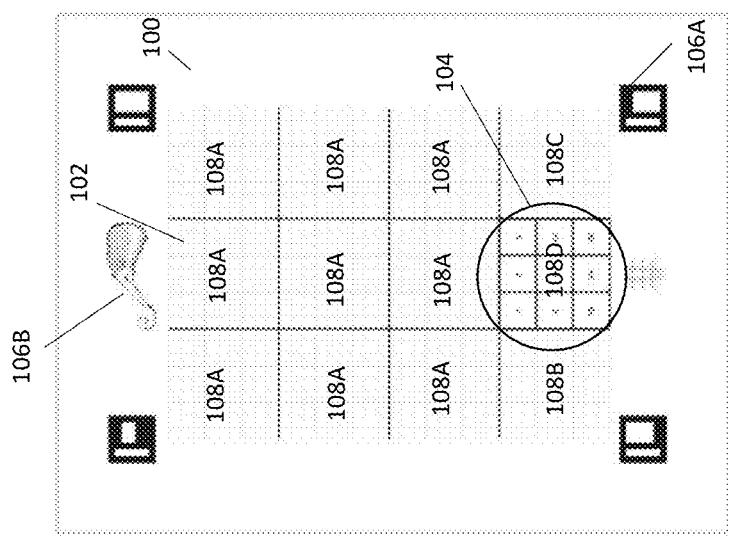
FIG. 2 is a view of an animation template, according to one or more embodiments.

FIG. 2 is a view of a template 100, according to one or more embodiments. The template 100 may be configured to provide guidance to a user to create an animation. As mentioned, the guidance may relate to the drawings used to generate an animation and/or to features of an animation, where the features of the animation may be particularly suited for the associated computing system or software. As shown, the template may include a foundation 102, an auxiliary control feature 104, and a template information feature 106A/B.

The foundation 102 may be configured to provide guidance to the user on the location of content such as one or more particular drawings that may be used in the creation of an animation. For example, the foundation may define a series of juxtaposed positions that may allow for an animation generator to transform the content of each position to be related in time rather than space. In one or more embodiments, the series of juxtaposed positions may be arranged on a substrate and may extend laterally across the substrate, longitudinally up and down the substrate, or, in the case of a grid, both laterally across and longitudinally up and down the substrate. Most any arrangement may be used where a series of juxtaposed positions is discernible when viewing the substrate. For example, a series of positions in the form of a spiral may be provided or a series of positions that form pathway may be provided. In one or more embodiments, the positions may have a same or similar size and may be square, for example, such that both the horizontal and vertical center-to-center distance between the positions is the same. However, a series of positions arranged horizontally may each have a same horizontal width and a same vertical height where the width is different from the height. That is, a series of congruent rectangles, for example, may be provided. It is to be appreciated that while no space is shown between the positions, spaces between them may be provided. Where a space is provided, the positions may still be considered to be juxtaposed because a resulting animation generator may be designed to ignore the space between the positions. Still other sizes and/or arrangements for the series of juxtaposed positions that form a foundation may be provided.

The several positions of the foundation may be identified by dividing lines forming a tabular appearance having rows and columns where each position is outlined by a line border. In other embodiments, the several positions may not be outlined, but may instead be identified by a center point. In other embodiments, both a center point and dividing lines may be provided. In one or more embodiments, the several positions may be identified by circles, see FIG. 9, or other boundary shapes. The dividing lines, center points, circles, or other boundary shapes may be adapted to inform the user where the content for each frame of an animation should be positioned.

Figure 14:
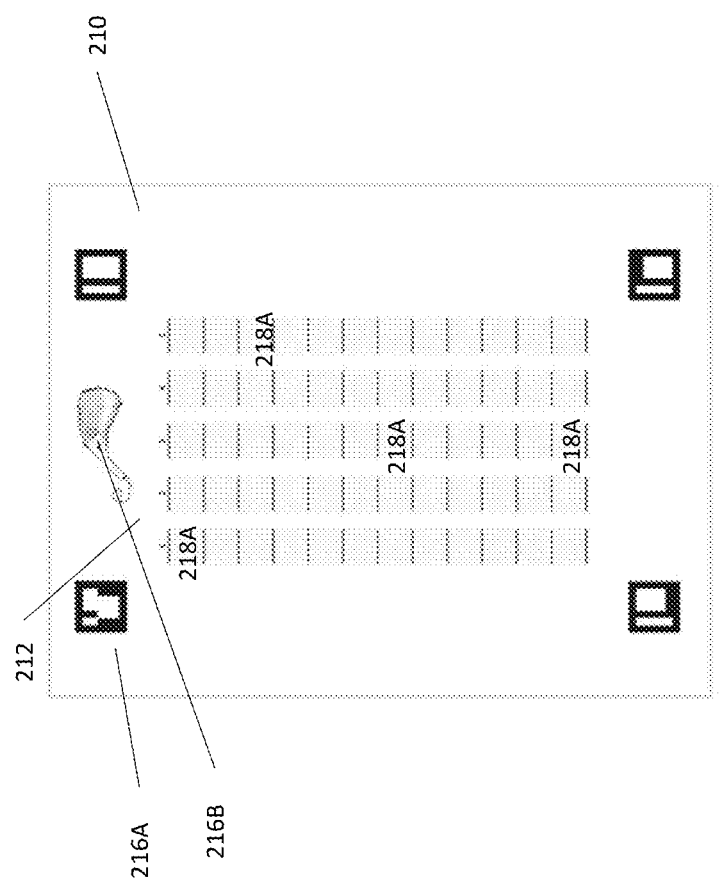
FIG. 14 is a view of an animation template providing for multiple animations on a single template, according to one or more embodiments.
Figure 15:
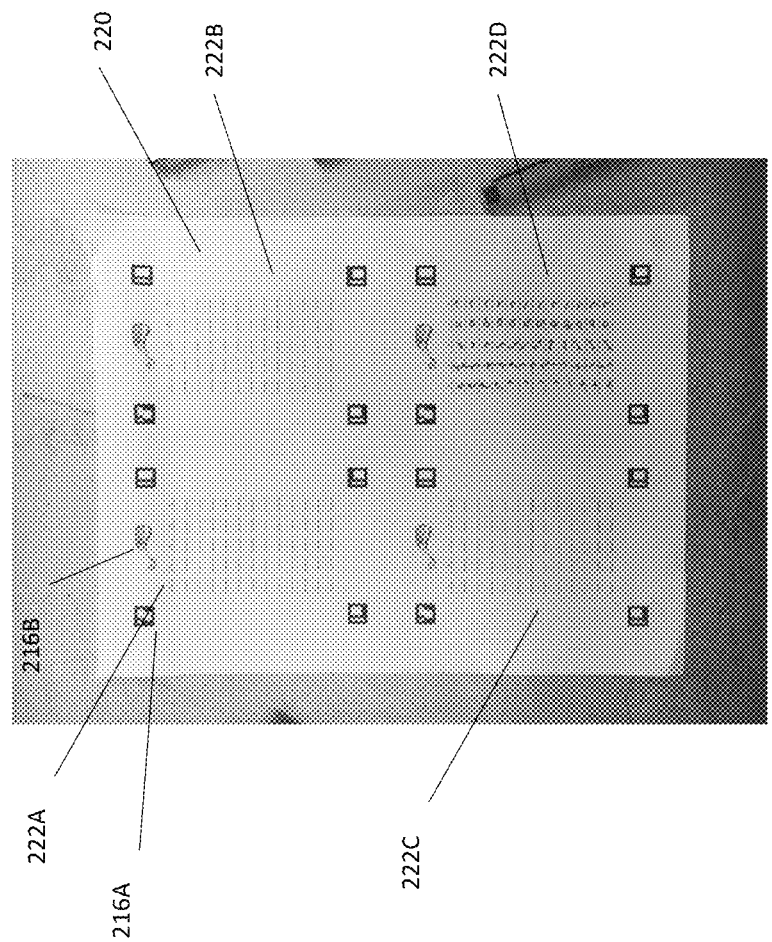
FIG. 15 is a view of an animation template providing for multiple animations on a single template, according to one or more embodiments.

In the present application a wide variety of foundations are shown from FIGS. 2-9. In FIG. 2, for example, a foundation having four rows of three juxtaposed positions is shown. More or fewer positions may be provided by the foundation and may range from as few as two positions to as many as might reasonably fit on the surface of a substrate. For example, where the substrate is an 8½×11 sheet of paper, the largest number of reasonable positions may range from approximately 8 positions laterally and 11 positions vertically making an 88 position grid with approximately 1 inch by 1 inch positions. Still smaller positions may be provided such that 110 positions (e.g., 10×11) or 150 positions (e.g., 10×15) are provided. FIGS. 14 and 15 discussed in more detail below, for example, provide for multiple animations on a single template and have relatively high numbers of positions.

The more positions that are provided for a given substrate, the smaller the position may be, which may begin to make it difficult for a user to provide discernible content in any given position. As such, a reasonable number of foundation positions may be provided based on the available space on the substrate. Substrates may take many different forms and may include paper, chalkboards, whiteboards, dry erase boards, electronic boards or screens, or other artistic interfaces. For example, other artistic interfaces may include the side of a building, cereal box, skin (e.g., tattoo), wallpaper, wrapping paper, greeting card, t-shirt, posters, and still others. While multiple substrates may be used for a given animation, in one or more embodiments, the foundation may be sized and shaped to fit on a single substrate such that a single image may capture all of the information used to generate an animation. A series of additional embodiments are discussed with respect to FIGS. 4-9 below that show a wide range of foundation sizes and arrangements. Still other foundation sizes and arrangements may be provided.

With continued reference to FIG. 2, the positions of the foundation may be designated or arranged to receive particular types of content. For example, positions 108A may be adapted to receive active content such as drawings that change slightly from frame to frame, where the content of the positions 108A creates the motion in the animation when the content of these positions is arranged in time rather than space. As such, the positions 108A may be arranged having a series of juxtaposed relationships so as to be readable, for example. That is, where a particular foundation has a tabular format, the series of juxtaposed positions may include the positions in a row followed by the positions in the next row below the row. Alternatively, the series of juxtaposed positions may include the positions in a column followed by the positions in the adjacent column. Where a spiral is used, the series of juxtaposed positions may follow the spiral. Where a pathway is used, the series of juxtaposed positions may follow the pathway. In contrast, position 108B may be adapted to receive still content such as a background drawing intended by the user to be used throughout the animation where the active content from the positions 108A is performed in front of the background image. A separate position 108C may adapted to receive still content such as a foreground drawing intended by the user to be used throughout the animation where the active content from the positions 108A is performed behind the foreground image. In one or more embodiments, positions 108B/C may be arranged at the end of the series of juxtaposed positions 108A to isolate these positions from the otherwise running series of positions 108A. Of course, positions 108B/C could also be arranged at the beginning of positions 108A. Still other positions including positions that interrupt the series of juxtaposed positions 108A may also be used. In one or more embodiments, labels or instructions may be provided on the template that identify positions 108A/B/C as being active/still content positions.

Still further, position 108D may be designated or arranged to receive different information or to provide a location for an auxiliary control feature 104, for example. That is, as shown in FIG. 2, position 108D may include an auxiliary control feature 104 and, as such, may not be adapted to receive content, but instead may be adapted to receive auxiliary control information. Like positions 108B/C, position 108D may be arranged in isolation from the positions 108A so as to avoid interruption of the active content in those positions. In one or more embodiments as shown in FIG. 2, position 108C may be arranged at the end of a series of positions 108A and in between a background position 108B and a foreground position 108C. Still other locations for position 108D including positions that interrupt the series of juxtaposed positions 108A may be provided. It is to be appreciate that while two still content positions 108B/C and one auxiliary control feature position 108D have been shown, several other numbers of these positions may be provided. In particular, where a higher level of auxiliary control is desired, a larger number of auxiliary control positions may be provided.

Figure 3:
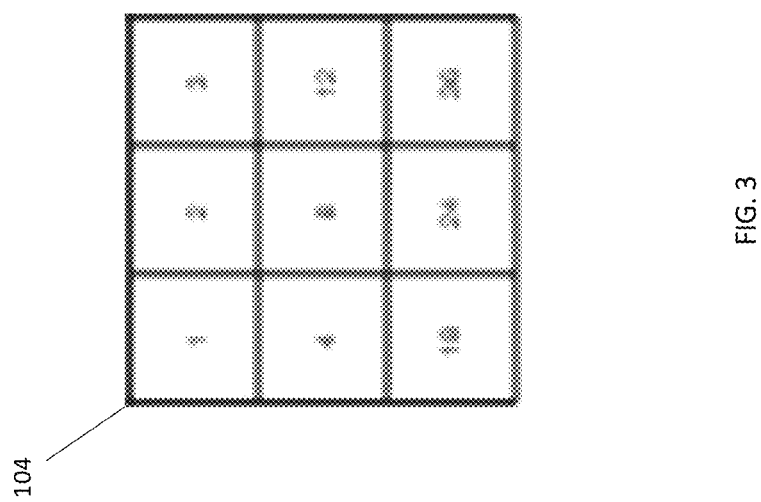
FIG. 3 is a view of an auxiliary control feature of the template of FIG. 2, according to one or more embodiments.
Figure 4:
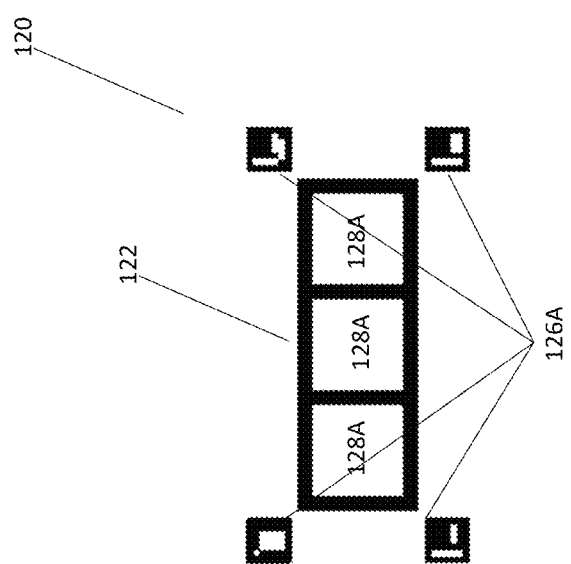
FIG. 4 is a view of an animation template, according to one or more embodiments.

With reference to FIG. 3, the auxiliary control feature 104 may be configured to allow a user to communicate presentation information to a supporting computing system. That is, for example, auxiliary control feature 104 may be adapted to receive an indication from the user of a desired speed of the animation in frames per second, for example. As shown, the auxiliary control feature may include a series of selections available to a user. The series of selections may be in the form of a table having varying animation speeds arranged therein. The table may allow a user to select a speed by coloring in the cell or placing an X through the cell in the table having the desired speed, for example. (See FIG. 27A for an example of a completed auxiliary control feature) Alternatively or additionally, the series of selections may include bubbles and a user may select a speed by coloring in a bubble. In still other embodiments an open cell may be provided for writing in a speed in number form. Still other ways of providing an input feature may be provided. Moreover, while presentation information in the form of speed (e.g., frames per second) has been discussed, still other types of presentation information may be provided such as formatting information, brightness information, sound information, or visual effects such as Tint-Red or Parallax, or other information affecting the way the animation is presented and which is not generally suitable for placement in one of the juxtaposed content positions 108A. For example, in one or more embodiments, the presentation information may be in the form of tint, rotation, pixilation, blur-effect, shake-effect, tiling effect, or other effects. In these embodiments, for example, the auxiliary control feature may be in the form of a series of icons selectable by the user by shading, circling, or other indication to provide the respective effect to the resulting animation.

Turning back to FIG. 2, the template information feature 106A/B may be configured to convey template information to a supporting computing system. For example, having discussed the variability of foundations that may be utilized by a user, the template information feature may convey foundation arrangement information such as 1×3, 3×3, 3×4, another tabular arrangement, spiral, strip, or any other indication that conveys the positions of the cells. The template information feature may also indicate where particular content positions are located. That is, the template information feature may indicate where the active content positions 108A, the background position 108B, the foreground position 108C, another still content position, and/or the auxiliary control feature position 108D are located on the foundation. As discussed later in this application, some foundations may have guidance content in one or more of the content positions of the foundation and the template information feature may convey the level and/or type of content that is present in the positions.

In one or more embodiments, the template information feature may include multiple features arranged around or near the foundation and the position of the feature may be relevant for defining the bounds of the foundation. For example, as shown in FIG. 2, the template information feature 106A may include four features where each feature is arranged at one of the four corners of the foundation. As such, these features may convey template information by conveying the four corner positions of the foundation. In one or more embodiments, the template information feature 106A may include a fiducial that not only conveys information due to its position relative to the foundation, but also conveys information in readable code form. For example, the fiducials may be QR codes, bar codes, or another data readable code element. The data or information stored in the codes and readable by a computing device may include template information as mentioned above and each of the fiducials may be unique to allow for recognition of each fiducial individually further supporting orientation efforts of a computing device, for example. That is, the fiducials may be recognizable as being the top/left, bottom/left, top/right, and bottom/right fiducials allowing the computing system to understand a suitable orientation for the animation.

Alternatively or additionally, the template information feature 106B may include a single feature arranged around or near the foundation such as at a top of the foundation. For example, the template information feature may include a shape, a letter, and/or an object. In one or more embodiments, the template information feature 106B may be a particular animal. Depending on the nature of the particular template being used, different shapes, letters, objects, animals, or other types of template information features may be used. While template information features have been described as a fiducial or, separately, as a shape, letter, object, or animal, nothing should limit overlapping uses of these types of template information features. For example, things like a shape, letter, object, or animal could be used to define the boundaries of the foundation while a fiducial is used in singular form to convey foundation information. Various combinations of these template information features may be used or one of them may be used on its own, for example.

Given this overview of the foundation 100, its several types of positions 108A/B/C/D, the auxiliary control feature 104, and the template information feature 106A/B, several different types of foundations are shown at FIGS. 4-9. For example, FIG. 4 includes a template 120 with a foundation 122 having three active content positions 128A arranged in a row and outlined. Four template information features 126A are arranged at the corners of the foundation in the form of fiducials. This particular template 120 does not include an auxiliary control feature.

Figure 5:
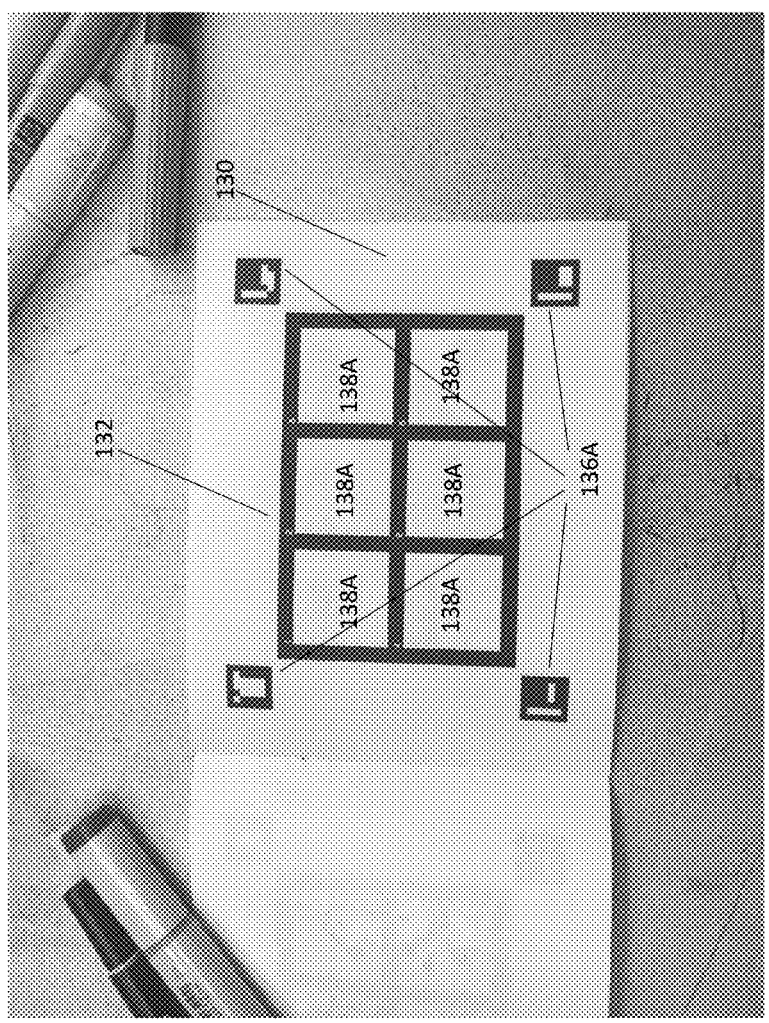
FIG. 5 is a view of an animation template, according to one or more embodiments.

FIG. 5 includes a template 130 having a foundation 132 with six active content positions 308A arranged in two stacked rows of three active content positions 138A. Four template information features 136A are arranged at the corners of the foundation in the form of fiducials and no auxiliary control feature is provided.

Figure 6:
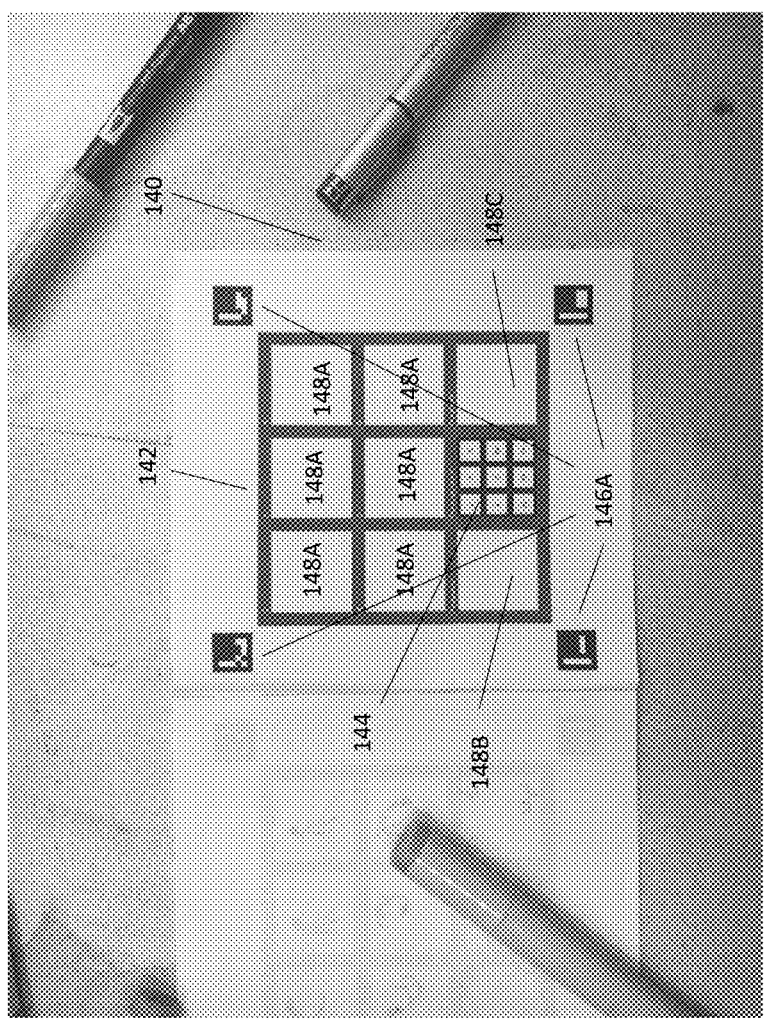
FIG. 6 is a view of an animation template, according to one or more embodiments.

FIG. 6 includes a template 140 having a foundation 142 with six active content positions 148A, two still content positions 148B/C, and an auxiliary control feature positions 148D with an auxiliary control feature 144 arranged therein. Four template information features 146A are arranged at the corners of the foundation in the form of fiducials.

Figure 7:
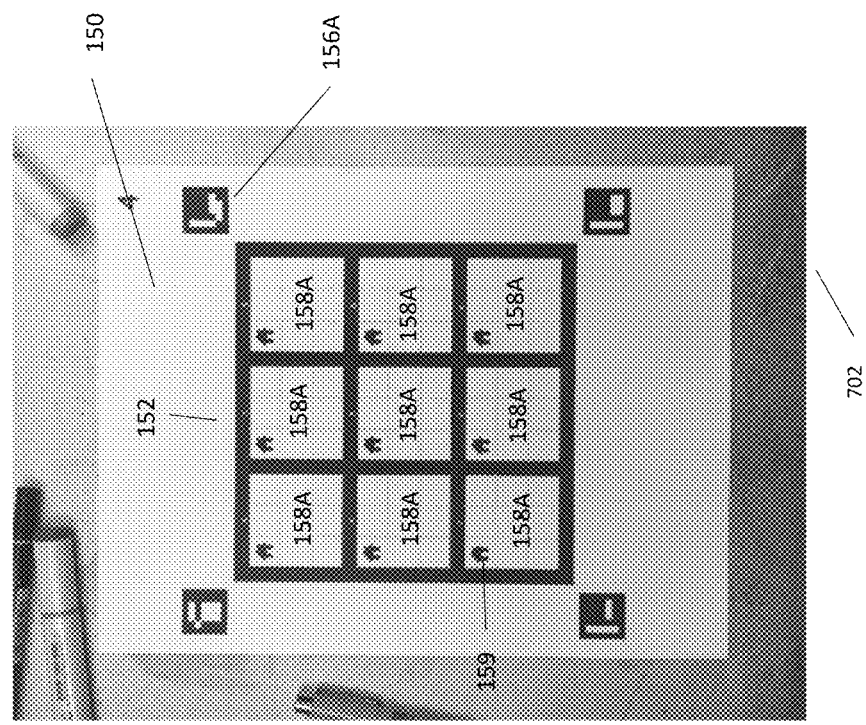
FIG. 7 is a view of an animation template, according to one or more embodiments.

FIG. 7 includes a template 150 having a foundation 152 with nine active content positions 158A. Four template information features 156A are arranged at the corners of the foundation in the form of fiducials and no auxiliary control features is provided. In addition, the positions 158A of the foundation 152 include a teaching technique designation. For example, the designation may be in the form of a home and may be used to teach an animation technique involving an animation loop where the home is used as a reminder to start at one animation position (home) and depart from that position by creating differing content that "moves" away from the first animation position, but returns to the first animation position (home) by the end of the series of frames. The teaching technique may be described as starting at home, leaving on an adventure away from home and returning to home by the end of the series of animation positions.

Figure 8:
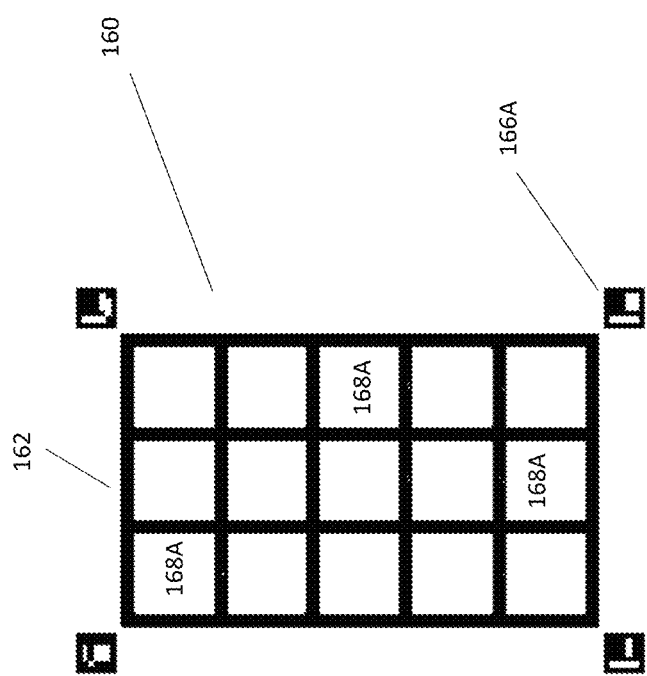
FIG. 8 is a view of an animation template, according to one or more embodiments.

FIG. 8 includes a template 160 having a foundation 162 with fifteen active content positions 168A. Four template information features 166A are arranged at the corners of the foundation 162 in the form of fiducials and no auxiliary control feature is provided. As may be appreciated a wide range of templates may be provided with varying foundation sizes and types, varying numbers and types of template information features, and varying numbers and types of auxiliary control features. As such, a user may be provided with the ability to create varying animation lengths with varying amounts of detail and may also be provided with varying amounts of control over the presentation of the resulting animation.

Figure 9:
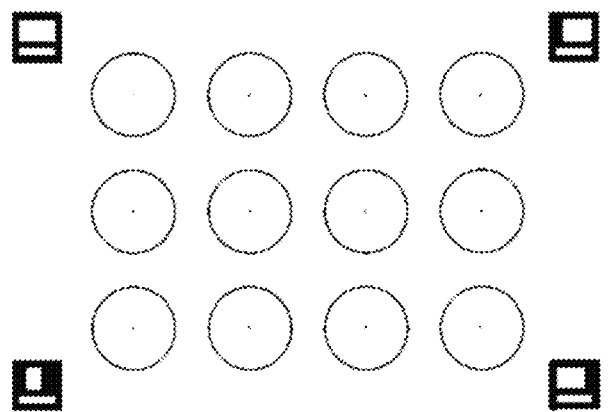
FIG. 9 is a view of an animation template, according to one or more embodiments.

FIG. 9 includes a template having a foundation with twelve active content positions that are defined by circles rather than tabular grids or cells. Four template information features are also provided and arranged at the corners of the foundation.

Figure 10:
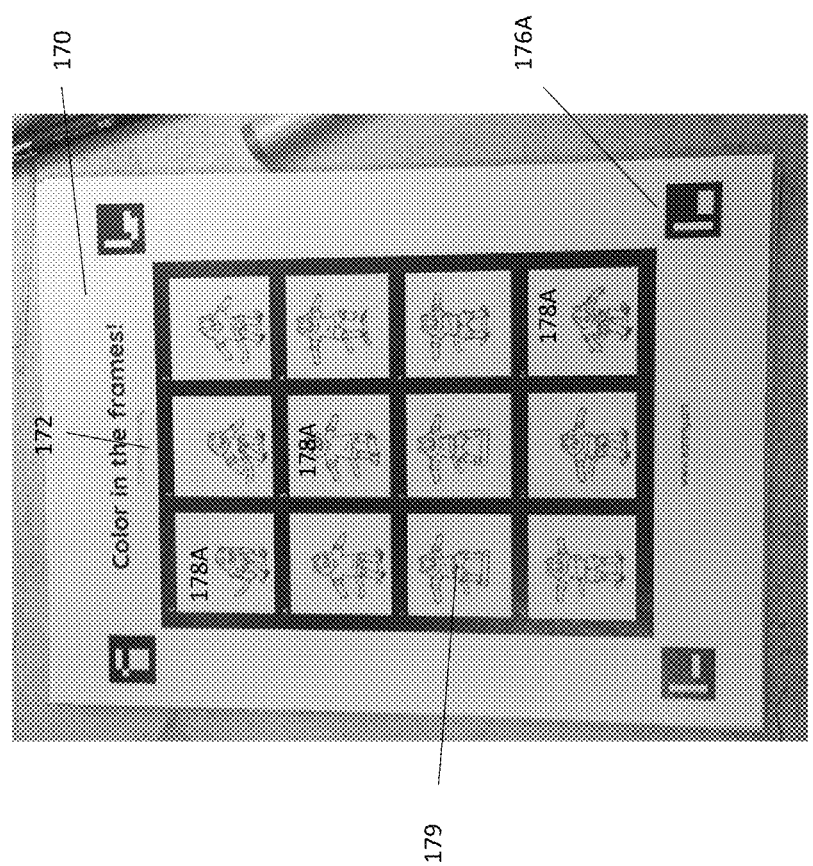
FIG. 10 is a view of an animation template having content guidance, according to one or more embodiments.

FIG. 10 includes a template 170 having a foundation 172 with twelve active content positions 178A. Four template information features 176A are arranged at the corners of the foundation 172. No auxiliary control feature is provided. However, the template may include guidance content 179. For example, as shown, an outline of a cat on a skateboard is provided in each of the active content positions. Near the beginning of the series of juxtaposed positions, the cat is squatting and poised to jump. Positions 2-4 show the cat extending its legs to jump for purposes of performing a kickflip of the skateboard. Positions 5-8 show the progression of the flipping board while the cat is in the air above the board and position 9 shows the cat catching the flipping board with its feet. Positions 10-12 show the cat approaching and landing on the ground and absorbing the impact by bending its knees. As such, this animation template could be captured and an animation could be created without doing anything to the template. However, the purpose of this template may be to allow a user to color, add further black/white line detail (e.g., decals or patterns on the skateboard or other augmentation) in the content to create a colorful or more detailed animation and, at the same time, begin to understand how to create animations (e.g., how to draw consecutive motion images and to what degree of detail is reasonable) due to the example provided.

It is to be appreciated that guidance content in this example is in the form of an outline. However, guidance content could also be in the form of a skeletal drawing where fleshing out of the figures or other detail (e.g., fur, hair, skin, etc.) may be added. Still other forms of guidance content may include partially filled in frames with blank frames in between where the user may include the drawing or drawings that create the transition between one frame and a later frame, for example. Still other forms of guidance content may be provided such as connect-the-dot guidance. In still other examples, the guidance content may be provided in green-screen form so the guidance features may be removed during the animation generation process and not visible in the resulting animation. In one or more embodiments, the guidance content may include markings that act as visual guardrails leading the pupil towards a successful animation"

Figure 11:
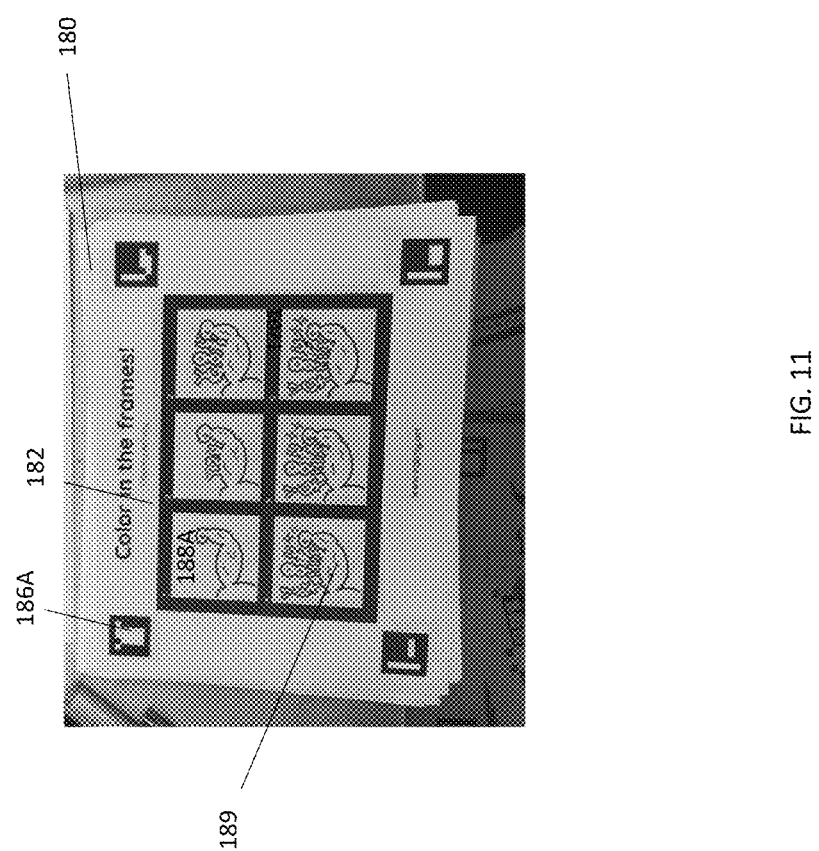
FIG. 11 is a view of an animation template having content guidance, according to one or more embodiments.

FIG. 11 includes a template 180 having a foundation 182 with six active content positions 188A. Four template information features 186A are arranged at the corners of the foundation 182 and no auxiliary control is provided. However, like template 170, this template may include guidance content 189. In this template a bicep is shown to be flexing and to progressively extrude words therefrom such that the phrase "you got this" progressively grows out of the bicep and is then displayed for a period of time by having the same content in positions 4-6. Again, without more, this template may be used to create an animation, but it may also be colored or further black/white line art may be added such as by adding veins to the muscles, shading, or other non-color art, for example. The user may, thus, create a colorful or more detailed animation and to begin go learn how to create animations themselves.

Figure 12:
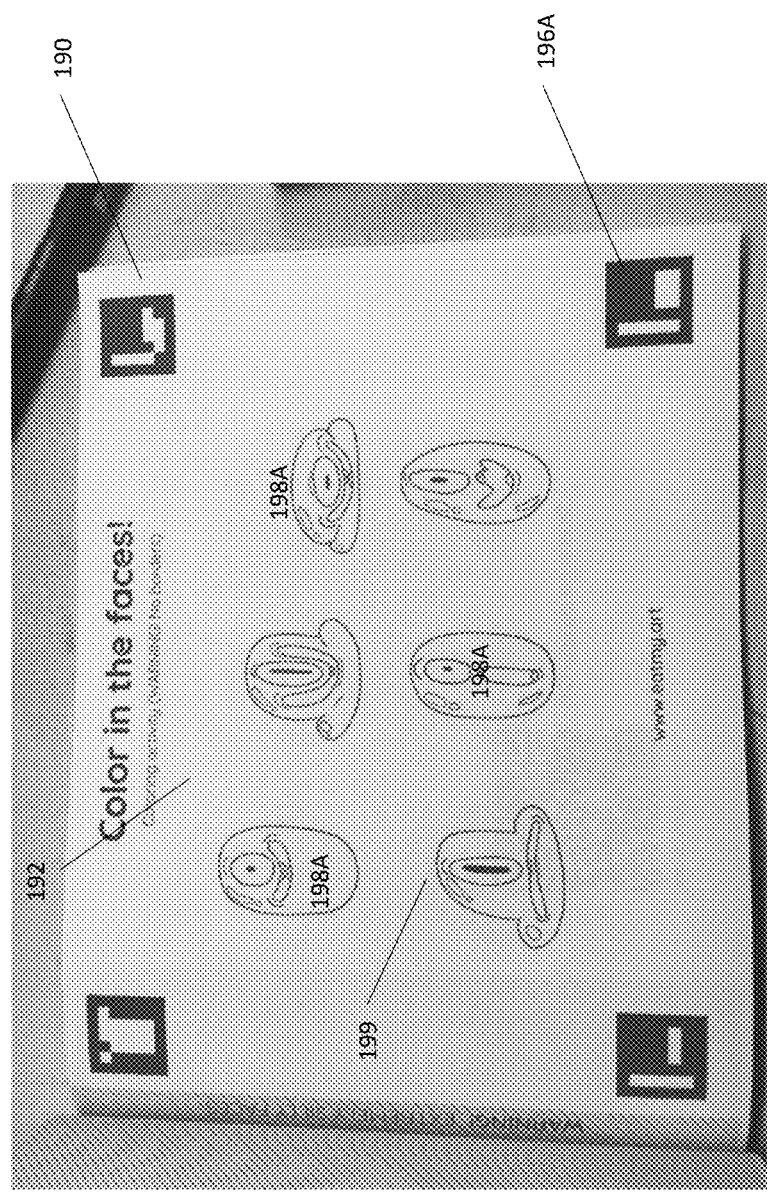
FIG. 12 is a view of an animation template having content guidance, according to one or more embodiments.

FIG. 12 includes a template 190 having a foundation 192 with six active content positions 198A. It is noted that no grid lines, center points, or other identifying features are provided. Four template information features 196A are arranged at the corners of the foundation 192 and no auxiliary control is provided. Like FIGS. 10 and 11, this template may include guidance content in the form of a outlines of a progressively squishing alien or cyclops face. Like FIGS. 9 and 10, this template may be colored allowing a user to create a colorful animation while also learning how to create animations themselves.

Figure 13:
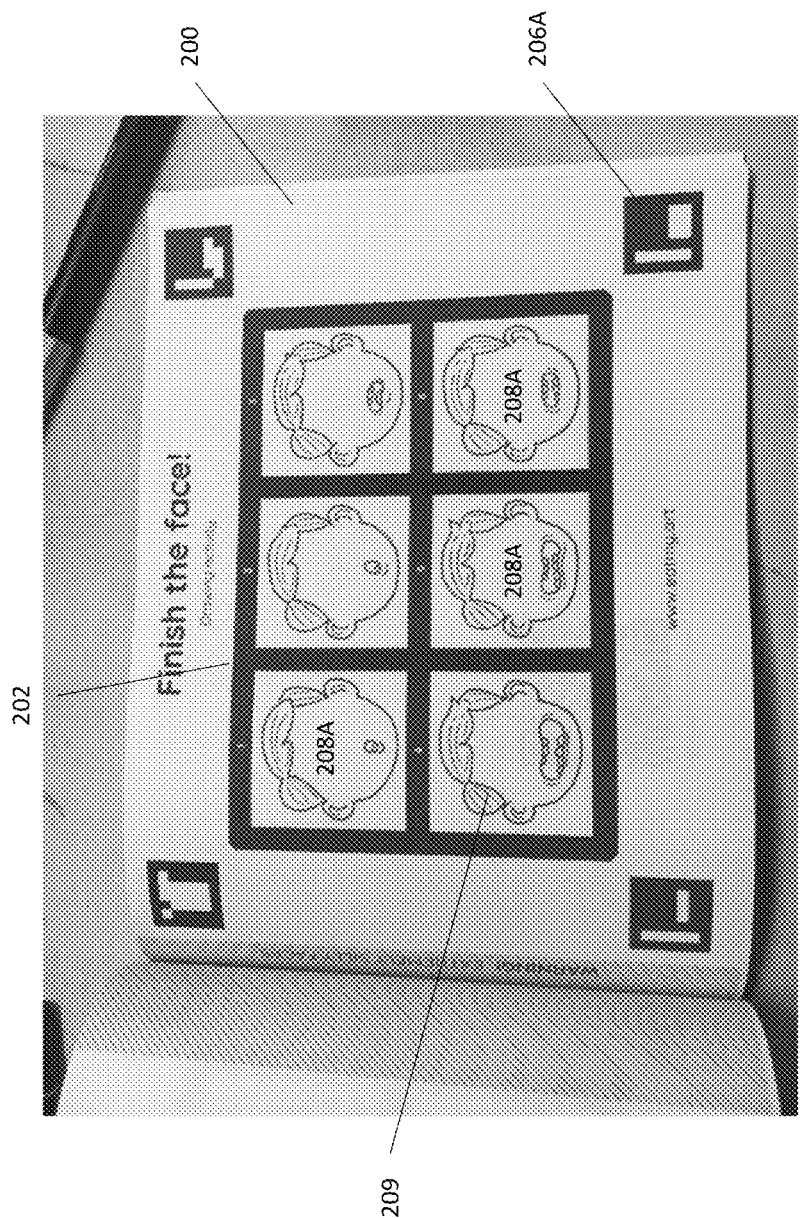
FIG. 13 is a view of an animation template having content guidance, according to one or more embodiments.

FIG. 13 includes a template 200 having a foundation 202 with six active content positions 208A. Four template information features 206A are arranged at the corners of the foundation 202 and no auxiliary control is provided. Like FIGS. 9-11, this template may include guidance content 209. However, a bit less guidance content may be provided when compared with FIGS. 9-11. For example, here an outline of a head with varying mouth shapes on the face of the head is provided. However, no eyes or nose are provided on the face. As such, a user may use this template by drawing in varying eyes and a varying nose and may complete the animation by coloring in the faces for each position. This template may be part of a series of templates that are part of a booklet, for example, where a small degree of artistic freedom (e.g., coloring) is provided near the beginning of the booklet and progressively greater degrees of artistic freedom (e.g., more free drawing of animation content) are provided as a user makes their way through the booklet.

FIG. 14 includes a template 210 having a foundation 212 with sixty active content positions 218A. Four template information features 216A are arranged at the corners of the foundation 212 and a template information feature 216B is provided at the top of the foundation. No auxiliary control is provided. However, the present template may be adapted for providing multiple animations and, in particular, five, twelve frame animations. That is, five columns of twelve active content positions may be provided. Each column may be used to create an animation such that five separate animations, each having twelve frames, may be created using a single template.

FIG. 15 includes a template 220 having multiple foundations 222A/B/C/D each having sixty active content positions. Four template information features 216A may be arranged at the corners of each foundation and a template information feature 216B may be provided at the top of each foundation. No auxiliary control is provided. This particular template may be adapted for providing multiple animations. That is, each foundation may be adapted to provide five animations that are each twelve frames long. With four foundations, this single template may be able to provide 20 animations on a single template.

Figure 16:
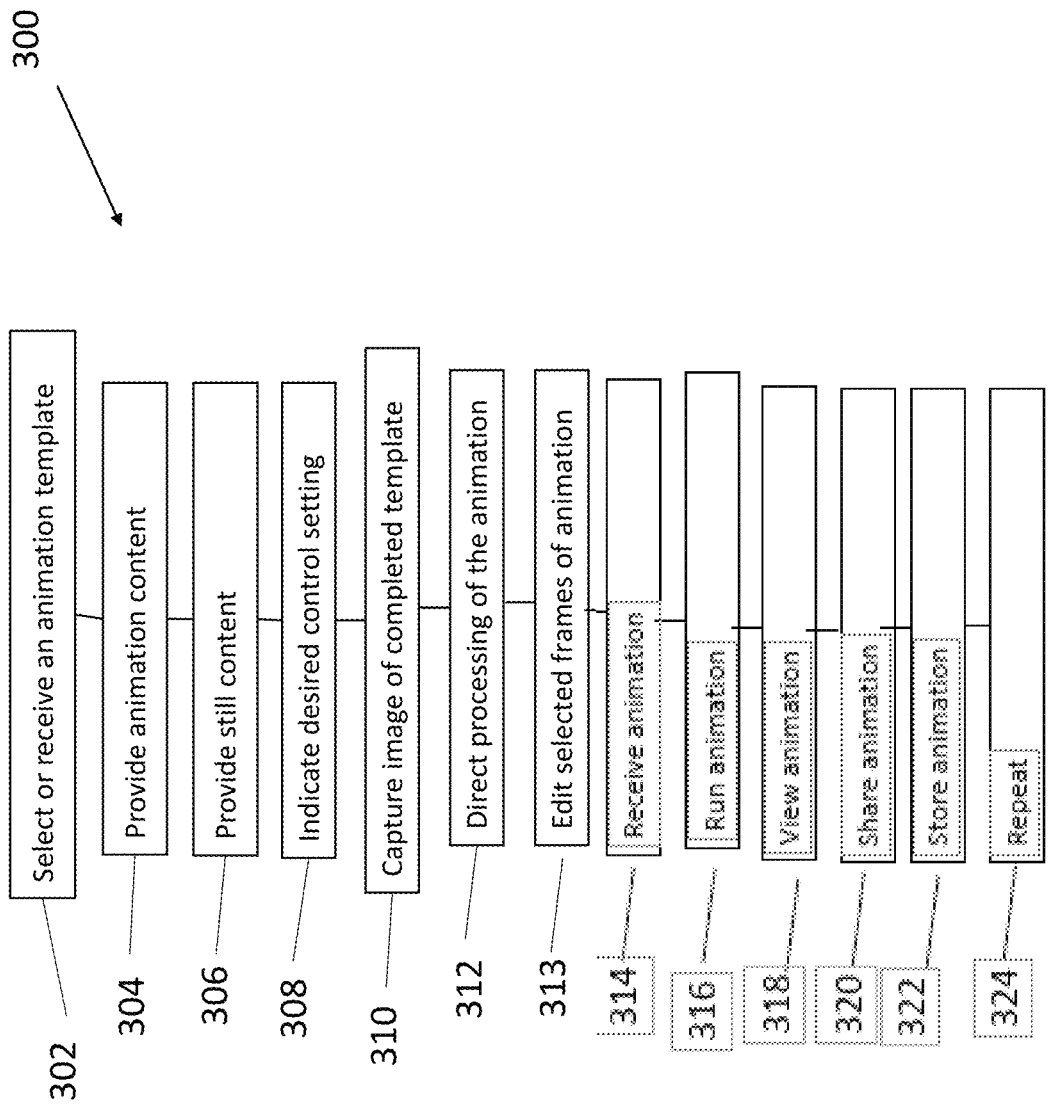
FIG. 16 is a diagram depicting a method of use, according to one or more embodiments.
Figure 17:
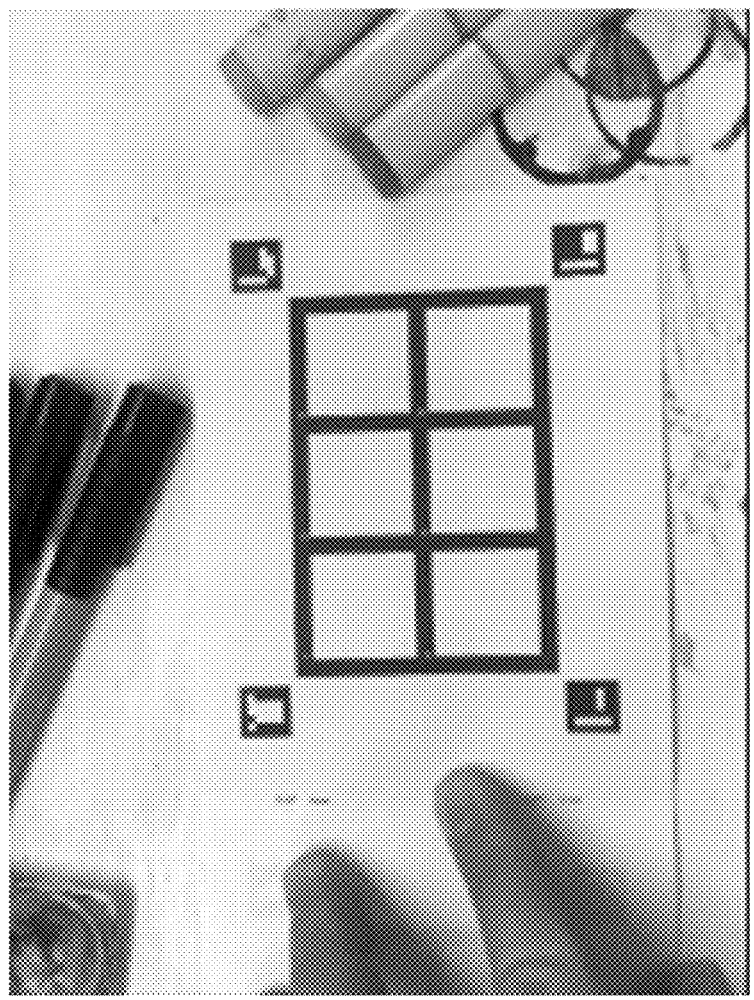
FIG. 17 is an image of a user that has obtained or received a template to create an animation, according to one or more embodiments.

In operation and use, an animation creation method 300 may be performed using one or more of the above-described templates. As may be appreciated from the discussion above, all of the information used by a computing system to generate an animation may be provided in by capturing a single image of a completed template. That is, this is in contrast to capturing multiple images of separate drawings or artworks. For example, and as shown in FIG. 16, the method 300 may include selection or receipt of an animation template 302. That is, where a user has purchased or is otherwise in possession of a variety of templates or has a booklet of templates, the user may select a template depending on how long an animation they would like to create, the amount of detail (e.g., foreground/background) they want to provide, how much control they would like over the resulting animation, how much guidance they would like in creating the animation, and how many animations they want to create on a single template. FIG. 17 shows a template selected by a user.

Figure 18:
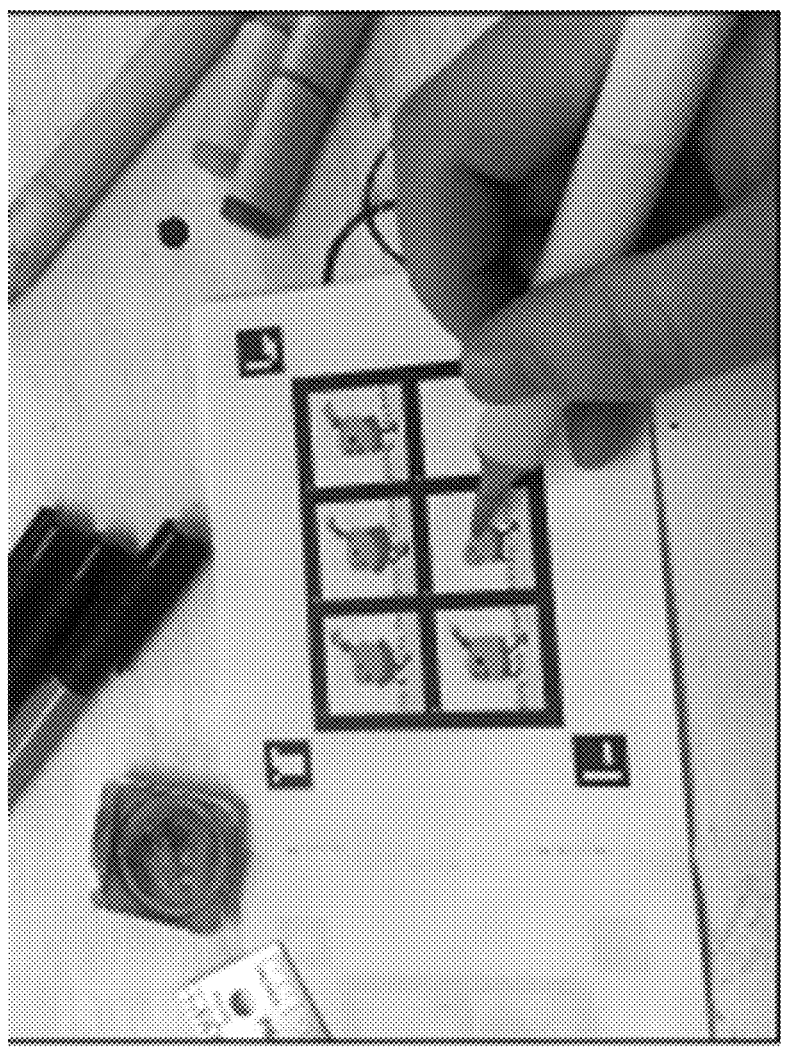
FIG. 18 is an image of a user providing animation content on a template, according to one or more embodiments.
Figure 19:
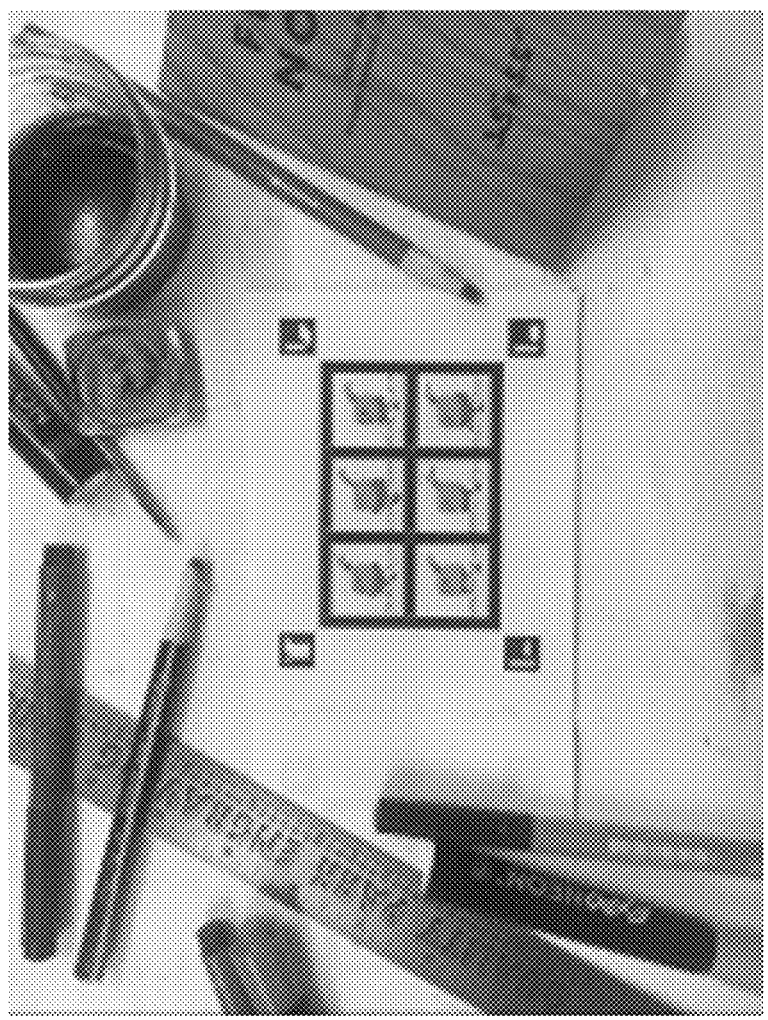
FIG. 19 is an image of the completed template, according to one or more embodiments.

The method may also include providing animation content 304. That is, the user may provide animation content by drawing, coloring, or otherwise depicting a progressively changing scene in the active content positions of the foundation of the selected template. FIG. 18 shows a user providing animation content and FIG. 19 shows a completed template. Where the user has selected a template having still content positions, the user may provide still content 306. For example, the user may draw, color, or otherwise depict a background and/or foreground for the animation in the still content positions of the foundation of the template.

Where the user has selected a template having an auxiliary control feature, the user may indicate their desired control setting 308. For example, the user may select between several available auxiliary control options or the user may write their desired control option. Where the template has selection options, the user may select an option by coloring in, x-ing through, or otherwise indicating which option they desire. Where the template just has a blank space for the auxiliary control feature, the user may write in their selection. In one or more embodiments, the selecting of an option of writing in of an option may include indicating a frame-per-second speed that the user desires for the animation.

Figure 20:
FIG. 20 is an image of an image capture device that has captured an image of the completed template, according to one or more embodiments.

When the template is completed by the user, the user may capture an image of the template 310. In one or more embodiments, this may include capturing an image of the template with a camera on a smartphone. This may be performed with a camera on a smartphone where the image is stored in a gallery or other storage location on the smartphone. Alternatively or additionally, capturing of an image may occur within an app on the smartphone. A captured template image is shown in FIG. 20.

The method may also include the user directing processing of the animation 312. For example, in one or more embodiments, the user may prepare and send a text to a designated number with the captured image attached. Other transmission techniques may include a WiFi data transfer, cloud data transfer, an email, a fax, a voice over internet protocol, a landline, a hardwired connection, combinations thereof, or other forms of communication. In other embodiments, the user may use an app on their smartphone or other computing system to process the image and create an animation. For example, in one or more embodiments, the user may direct processing of the animation by uploading a photo to a website. Still other approaches to directing processing of the animation may be used. Once uploaded through the website, the user may stay on the web page while a loading spinner displays until the GIF is finished, and displayed on the same page. On the backend, the image may be sent to a cloud server, processed, then sent back to the web page to be displayed on the user's smartphone or other computing device. In still other embodiments, the software for processing may be present on a user device and processing may occur on the user device providing a similar processing spinner while processing and then presentation of the GIF or animation.

During the animation generation process, in one or more embodiments, the user may be prompted to review the individual frames of the generated animation to allow for photo editing of particular frames. That is, as discussed in more detail below, part of the process may involve parsing or breaking the content in the several positions on the template into separate files for animation. Having done so, the computing system may present the frames in a photo editor, for example allowing the user to refine by editing each image or a selected one or more of the images 313. The photo editor may, for example, be used by a user to brighten, recrop, tilt, adjust scale, sharpen, change colors, or otherwise adjust any one or more selected frames. In one or more embodiments, the background/foreground may be swapped (e.g., if the user accidentally placed this content in the wrong positions) or other frame switches may be performed. This feature may also be available to a user after the animation is complete. That is, for example, if a user receives an animation (discussed below) and is interested in editing a particular frame or frames of the animation, the user may access the photo editor to adjust any selected frame or groups of frames after the animation is complete. This feature may help to avoid the need to redo or redraw one or more portions of the animation on the template, for example.

Following processing, the user may receive the resulting or compiled animation 314. For example, where a text was sent to a designated number, the user may receive a responsive text with an attachment that is a video or other file containing the animation. Where the captured image was sent using a different transmission technique, the compiled animation may be received via a same or similar transmission technique. Where an app or other local software was used to generate the animation, receiving the resulting animation may include receiving the animation within the app.

Figure 21:
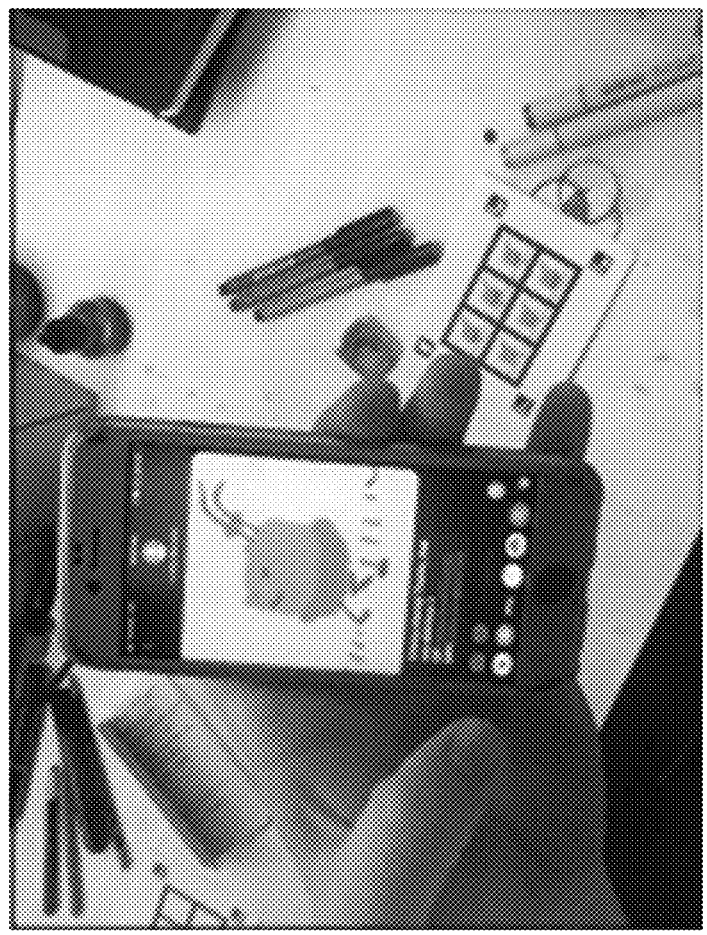
FIG. 21 is an image of a computing device displaying the resulting animation, according to one or more embodiments.

The method may also include running the animation 316. For example, the user may open a video or other animation file or may run the animation with an app or other software on a local computing system. The user may view the animation 318 share the animation with others 320, store the animation 322, or otherwise handle the animation. FIG. 21 shows a user viewing the animation. Where the user is interested in expanding their ability to create animations, the user may repeat the method by selecting templates providing increasing levels of artistic freedom 324.

Figure 22:
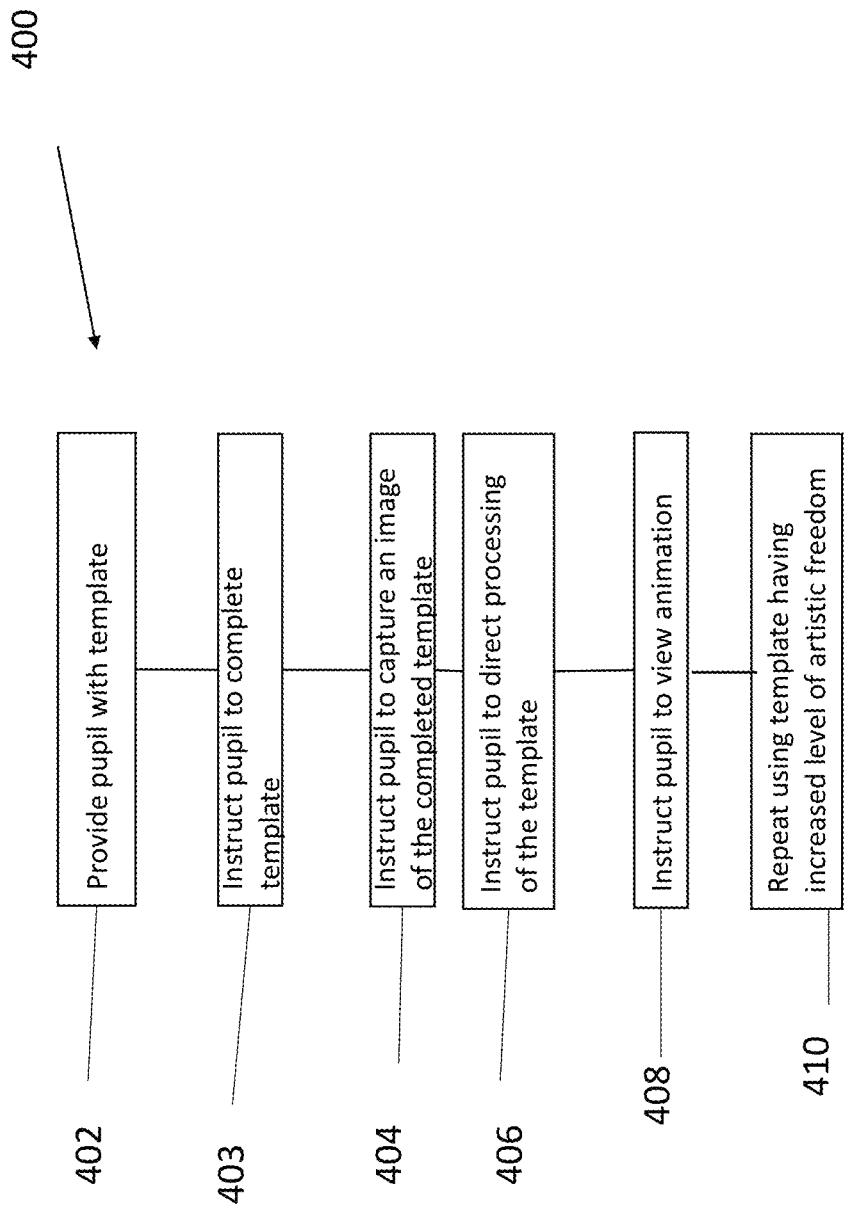
FIG. 22 is a diagram depicting a method of teaching animation, according to one or more embodiments.

In view of the above, a method 400 of teaching animation may also be provided. With reference to FIG. 22, the method 400 may include providing a template 402 to a pupil where the template includes a foundation with a plurality of active content position for creating an animation. The template may also include guidance content within the active content positions. The guidance content may, for example, provide outlines of one or more figures in varying degrees of motion and the method may include instructing the pupil to color the figures in the active content positions. The method may include instructing the pupil to complete the template 403 and capture the template 404, instructing the pupil to direct processing of the template 406, and instructing the pupil to view the resulting animation 408. The method may be repeated 410 several times where, each time, providing a template 402 to a pupil includes providing templates with increasing levels of artistic freedom and less control over the content of the animation. In one or more embodiments, the above method may be encompassed in a booklet where the booklet includes a series of templates that provide increasing levels of artistic freedom as the user moves through the booklet.

Figure 23:
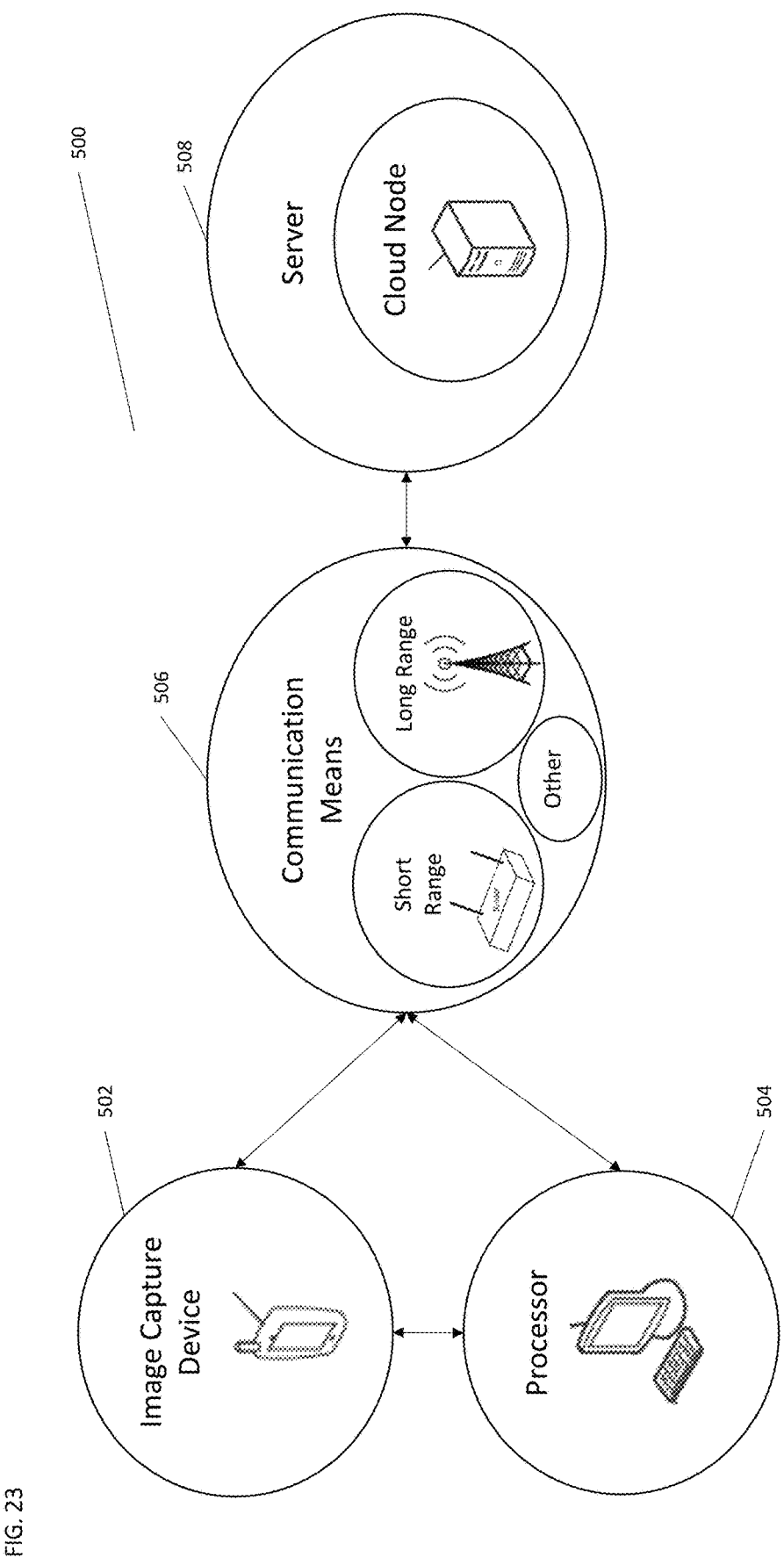
FIG. 23 illustrates a network connection diagram, according to one or more embodiments.

Turning now to the supporting computing system, FIG. 23 illustrates a network connection diagram depicting a system 500 including one or more components used to process an image of a completed animation template. As shown, the system may include an image capture device 502 that may communicate with a processor 504 and a communication means 506. The processor 504 may be located within the image capture device 502 or on a separate device. Generally, the image capture device 502 will capture a digital image and save the file to a device either locally or non-locally. From there, the processor 504 will send the image to a server 508 via a communication means 506. The communication means 506 may include short range communication, long range communication, or other forms of communication. Short range communication may include a WiFi data transfer, bluetooth, or a hardwired connection. Long range communication may include an sms message via a cell phone tower, a radio signal, or other forms of telephone, photo-telegraph, or television signals transmitted via air, cable, and radio communication lines. The communication means 506 may then transmit signals to a server 508. The server 508 may contain a processor or a cloud node for processing a signal from the communication means 506 and may redistribute the signal to another location. The server 508 may redistribute a processed signal from the cloud node back to a processor 504 or image capture device 502 via a communication means 506. This communication means 506 may send a signal back to the image capture device 502 or the processor 504 in the same fashion that it relayed an input signal to the server 508. It is to be appreciated that where software is present on the image capture device for processing the image, much of what is shown in FIG. 23 may not be utilized by the system. Instead, for example, the image capture device may have sufficient computing power and suitable software for processing the image and such processing may be performed by the image capture device such as a smartphone. In this situation, much of what is discussed below as being part of the server 508, may be part of the image capture device instead. That is, the system may be part of a computing system of a smartphone or desktop computer and may not function as a server or utilize a cloud node, for example.

Figure 24:
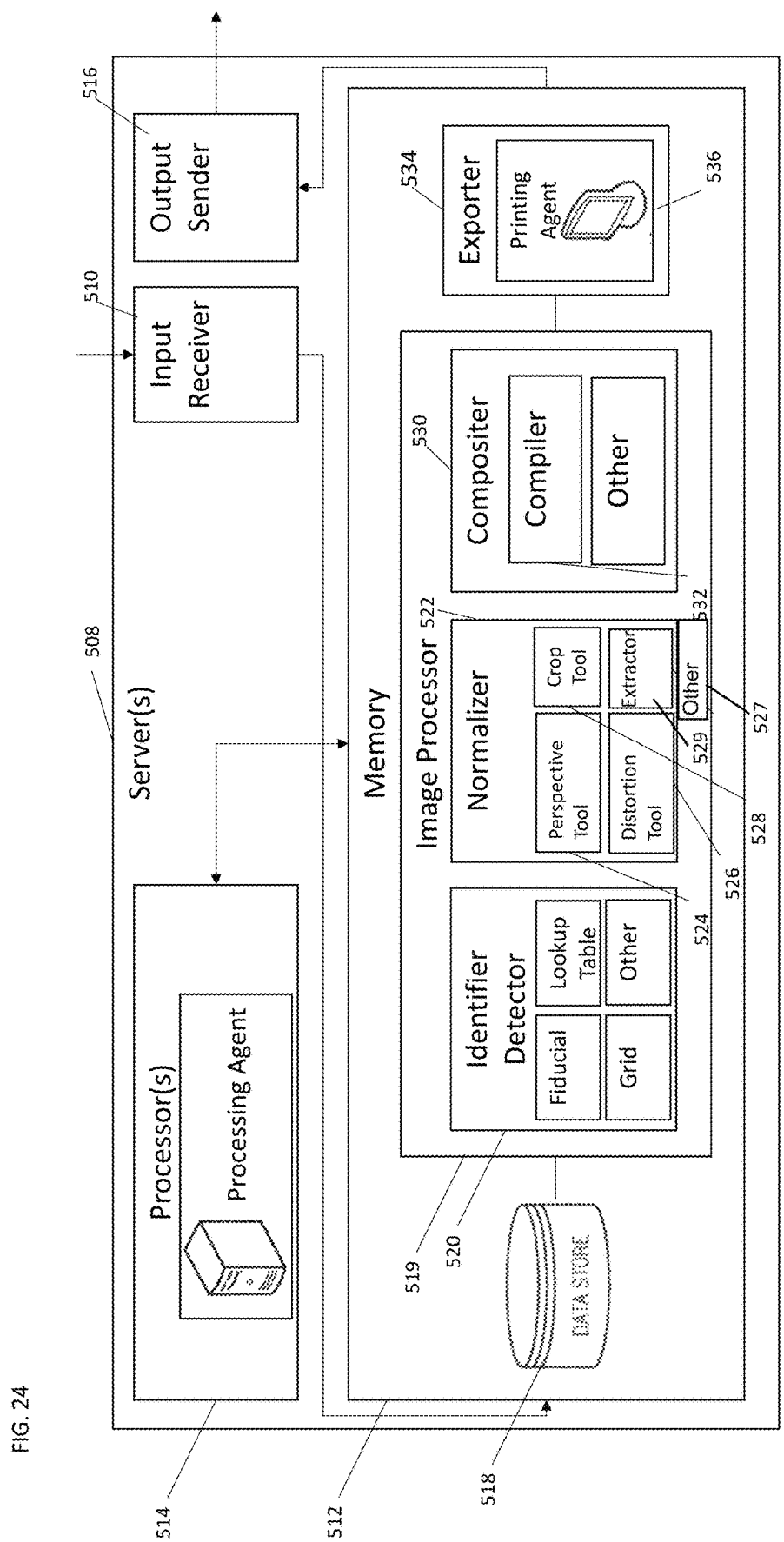
FIG. 24 is a server architecture diagram, according to one or more embodiments.

FIG. 24 includes a diagram of a computer architecture of the server 508 or other computing system for processing the image, for example. The server 508 or other computing system may include an input receiver 510, a memory 512, a processor 514, and an output sender 516. A signal may be sent from a local or non-local source to the server 508, where the signal is then received by the server by the input receiver 510. The input receiver 510 may then transmit the signal to be saved to the memory 512 via a processor 514. The processor 514 may supply computing power to perform actions within the memory 512.

Within the memory 512, a variety of actions may be performed to process images. First, data may typically be stored within a data store 518. The data store 518 may comprise a variety of storage space sizes based on a user's desired memory capacity. Once a signal is stored within the data store 518, the signal may be processed within the image processor 519. The image processor 519 processes images through an image processing method that may include three steps: (1) identifying relevant portions of a digital image stored in the memory, (2) normalizing the image or set of images, and then (3) compiling the image or set of images into a digital animation.

The step of identifying an image may be performed by an identifier detector 520. The identifier detector 520 may view a digital image that is stored in the data store 518 and sent to the image processor 519. When viewing the image, the identifier detector 520 may identify portions of the image that a user wishes to process while separating these portions from noise. Noise may include any portion of the image that the user does not wish to process. The identifier detector 520 may use a variety of methods to identify valuable portions of the captured image.

For example, one or more of the template information features 106A/B described above may be relied on to help identify relevant portions of the digital image. That is, for example, fiducials or other shapes or objects on the template that are unique to the template or a series of templates may be relied on by the identifier detector 520. That is, the fiducial or other shape or object may provide information to the identifier detector of the size, shape, or other parameter of the foundation so the identifier detector 520 understand the boundaries of the pertinent portion of the image. The position of the fiducials may also be used to help identify the pertinent boundary. In one or more embodiments, the outline of the foundation positions such as a grid or other special features of the template may be used. Still other features of the template may be relied on by the identifier detector 520 to identify relevant portions of the digital image.

In one or more embodiments, the identifier detector 520 may identify a valuable portion of a digital image by comparing an aspect of the foundation of a template or a fiducial to a predetermined value that is stored in a lookup table. This process may include subtracting the template from the digital image to isolate portions of the digital image that were created by the user. Further yet, the identifier detector 520 may identify the number of drawings created by a user within a digital image by comparing the foundation or fiducial to a plurality of predetermined values that are stored in a lookup table. The plurality of predetermined values may vary greatly in size, shape, and configuration. In some embodiments, the predetermined values in the lookup table may define the shape of the foundation. Additionally, the predetermined values of the shape or other factor may be proportioned to coincide with the work surface that is converted into a digital image and the overlap may be used to separate content from the template.

In still other embodiments, animation drawings may be created on substrates that do not include fiducials, grids, or other features providing guide posts for the computing system to identify valuable portions of the digital image. In these situations, in one or more embodiments, similarities from one portion of the image to another portion of the image may be relied on by the computing system. That is, an overall scan of the image by the computing system may allow the system to recognize repeating elements from one position to the next and may use a repeating element to assist in identifying the several positions in the image. For example, animation commonly involves small changes from one position's content to the adjacent position's content. As such, much of the imagery from one cell or position on the template may often be repeated in the adjacent cell or position. The computing system may rely on software akin to facial recognition software to recognize similarities from one portion of the image to the next and use those repeating similarities or progressing similarities to identify the several positions on the template or substrate.

In one or more embodiments, the identifier detector may include a machine learning component. That is, for example, in its effort to identify the relevant area of the image, the computing system may come across commonalities of recognition not initially appreciated. For example, as the identifier detector may repeatedly compare portions of the relevant portion of the image and look for repeating content (e.g., across multiple efforts to generate animations). In doing so, the computing system may begin to derive higher levels of confidence with respect to what constitutes image commonality sufficient to define separate positions and may begin to develop algorithms that more quickly assist in defining the constituent positions. For example, an absence of content (e.g., the space between positions) may begin to be a factor in how many positions there are and/or where the positions are located. Still other repeating truths from one template or substrate to another may begin to be suitable for the extractor to rely on to identify constituent aspects of the relevant portion of the image. In one or more embodiments, the system may rely on artificial intelligence techniques (such as machine learning, deep learning, neural networks) to identify regions of interest directly of a digital image." Similarly, the identifier detector may also look for similarities across a particular image and look for patterns of similarity allowing the system to establish a "grid" and to identify a valuable portion of the image for purposes of generating an animation. In still other embodiments, a user may be prompted to identify the extents of the several sets of content within an image and to enter a frame number. Still other approaches to focusing in on a relevant portion of an image for animation content and for providing a number of positions may be provided.

After the identifier detector 520 identifies a valuable portion of the digital image, a normalizer 522 may isolate the valuable portion of the digital image by eliminating noise. This process of isolating the valuable portion of the digital image while eliminating noise and otherwise preparing digital images to be composited is hereinafter referred to as normalization. The normalizer 522 may include a perspective tool 524, a distortion tool 526, a crop tool 528, and an extractor 529. The perspective tool 524 may identify a two-dimensional plane that an image lies on and adjust the positioning of that two-dimensional plane in a three-dimensional space such that the angle at which a user views the image is perpendicular to the two-dimensional plane. The perspective tool 524 may also identify a center point of a digital image that is isolated by the identifier detector 520 and adjust the positioning of the two-dimensional plane in a three-dimensional space such that the user views the image at the center point of the image and the user's view of the image is perpendicular to the two-dimensional plane.

The distortion tool 526 may distort an image by changing the shape of an object created by a user to resemble a different shape. This may be desirable to a user because it allows transitions to be completed between image frames that distort a first image to resemble a second image more closely over some period of time to create a more continuous view of an animation when the image frames are compiled into an animation. This is particularly advantageous because it allows a user to create a transition that appears to be continuous while lowering the speed or frames per second of the animation. This, in turn, also allows the user to create a digital animation while creating fewer drawings because the distortion of one image to the next may make some drawings redundant. In one or more embodiments, animations may also be converted between various speeds. That is, for example, a 24 frames per second animation may be converted to a 60 frames per second animation. In one or more embodiments, an artificial intelligence algorithm may be used for this conversion. For example, an artificial intelligence algorithm may be used to generate additional interstitial frames that smoothly transition between the frames drawn by the user. For example, a user may draw only six animation frames as input, then the system may intelligently analyze those frames to generate many in-between frames to supplement the user-drawn input frames to create the appearance of smoother motion, allowing playback at a higher frame-rate.

The crop tool 528 may crop an image by taking the portion of the image that was deemed to be valuable to the user by the identifier detector 520 and eliminating the remaining noise in the digital image. This is advantageous because it allows the user to take an image without requiring that the bounds of the image exactly match the portion of the image that the user deems to be valuable.

Other components of the normalizer 522 may be present to prepare the digital images to be compiled into an animation. For example, the normalizer 522 may comprise an extractor 529, wherein the extractor extracts the content in each of the positions of the foundation into individual frames and saves each frame separately to the memory 512 as a separate image file or object. The separate image file or object may later be accessed within the memory 512. The extractor may parse the content in the series of juxtaposed positions. The parsing process may take one or a combination of several forms. For example, where fiducials or other template information features are present on the template, the extractor may divide the relevant portion of the image into constituent parts based on knowledge of the number of positions on the template that it gleans from the fiducial or other template information feature. For example, if the template information feature indicates that there are nine active content positions, then the extractor may divide the relevant portion of the template into nine equal spaces and save each space as an individual file for the frames of the animation. In other embodiments, the extractor may rely on a grid that may be present on the template and may look for dividing lines between the positions of the grid to identify individual spaces within the relevant image to divide or parse the image. Each space divided by grid lines then may be saved as an individual file for the frames of the animation.

Still other approaches to parsing the relevant portion of the image into multiple images suitable for use in an animation may be provided. For example, where the number of images has not already been established by the identifier detector, in one or more embodiments, similarities from one portion of the image to another portion of the image may be relied on by the computing system. That is, an overall scan of the image by the computing system may allow the system to recognize repeating elements from one position to the next and may use a repeating element to assist in identifying the several positions in the image. For example, animation commonly involves small changes from one position's content to the adjacent position's content. As such, much of the imagery from one cell or position on the template may often be repeated in the adjacent cell or position. The computing system may rely on software akin to facial recognition software to recognize similarities from one portion of the image to the next and use those repeating similarities or progressing similarities to identify the several positions on the template or substrate.

In one or more embodiments, and again, where not already performed by the identifier detector, the extractor may include a machine learning component. That is, for example, in its effort to parse the relevant portion of the image into respective constituent images for an animation, the computing system may come across commonalities of recognition not initially appreciated. For example, as the extractor repeatedly compares portions of the relevant portion of the image and looks for repeating content, the computing system may begin to derive higher levels of confidence with respect to what constitutes image commonality sufficient to define separate positions and may begin to develop algorithms that more quickly assist in defining the constituent positions. For example, an absence of content (e.g., the space between positions) may begin to be a factor in how many positions there are and/or where the positions are located. Still other repeating truths from one template or substrate to another may begin to be suitable for the extractor to rely on to identify constituent aspects of the relevant portion of the image. Still other efforts to parse or identify individual frames not already performed by the identifier detector may be provided.

The normalizer may include other components or modules 527 adapted for performing particular tasks as well. For example, color correction, or other photo or video enhancing features may be provided.

The final step performed within the image processor 519 is to composite the frames, using a compositor 530, that are extracted during the identifying and normalizing steps. The compositor 530 composites frames by utilizing a compiler 532 to complete a pre-framing compositing process and a framing compositing process. The pre-framing compositing steps may include layering a background in front of an image frame, layering a foreground in front of an image frame, or applying visual effects dependent on each frame's spatial placement in the series of juxtaposed positions and its related timewise relationship to the overall sequence. The framing compositing steps may include placing each frame in a desired order by a user within the correct layer of the digital animation. A layer may be defined as a component of a complex image that defines how the image is placed relative to another image from the view of a user. For example, if a first layer is placed on top of a second layer, then the user would view the first layer as being in front of the second layer when the layers are added together to form the illusion of a three-dimensional animation on a two-dimensional screen. Other aspects of the compositor 530 may be used to add additional effects to a composited frame sequence. For example, an effector may loop the animation, set a frame rate, apply visual effects, add sound, or overlay text. Once the compositor 530 has composited the frames, a digital animation will be completed where each frame created by the user can be viewed continuously in the user's desired order.

After processing the image and creating a digital animation, the digital animation may be exported from the communication system's memory 512 through the use of an exporter 534. The exporter 534 may comprise a printing agent 536 that allows the animation sequence to be viewed within the memory 512. The printing agent 536 may comprise a display with icons that allow a manager or user to instruct the processor 514 to perform certain actions with the memory 512. The display may further comprise a graphical user interface generator and a graphical user interface, wherein the graphical user interface is capable of receiving inputs from a manager or user and exporting outputs, based on the input received from manager or user to the processor 514 to instruct the processor to perform a specific function within the memory 512. As discussed with respect to the user method at 313, the system may also allow for the user to edit the individual frames in a photo editor. That is, during or after generation of the animation the system may prompt a manager (e.g., at a server location for example) or a user (when a local device is being used) with individual frames in a photo editor allowing the manager/user to edit individual frames, swap frames, or otherwise edit the files used in the animation.

Finally, after exporting the digital animation from the communication system's memory 512 through the use of an exporter 534, the digital animation may be transmitted to an external source through the use of an output sender 516. The output sender 516 may transmit information via short range communication, long range communication, or other forms of communication. In one or more embodiments, the output sender may send the digital animation to a user or to the image capture device or processor controlled by the user. It is to be appreciated that while the present system has been shown to transmit the captured image, process the capture image, and transmit the image back to the user, the processing of the captured image may also be performed on a user's computing system and the transmitting steps may be omitted.

Figure 25:
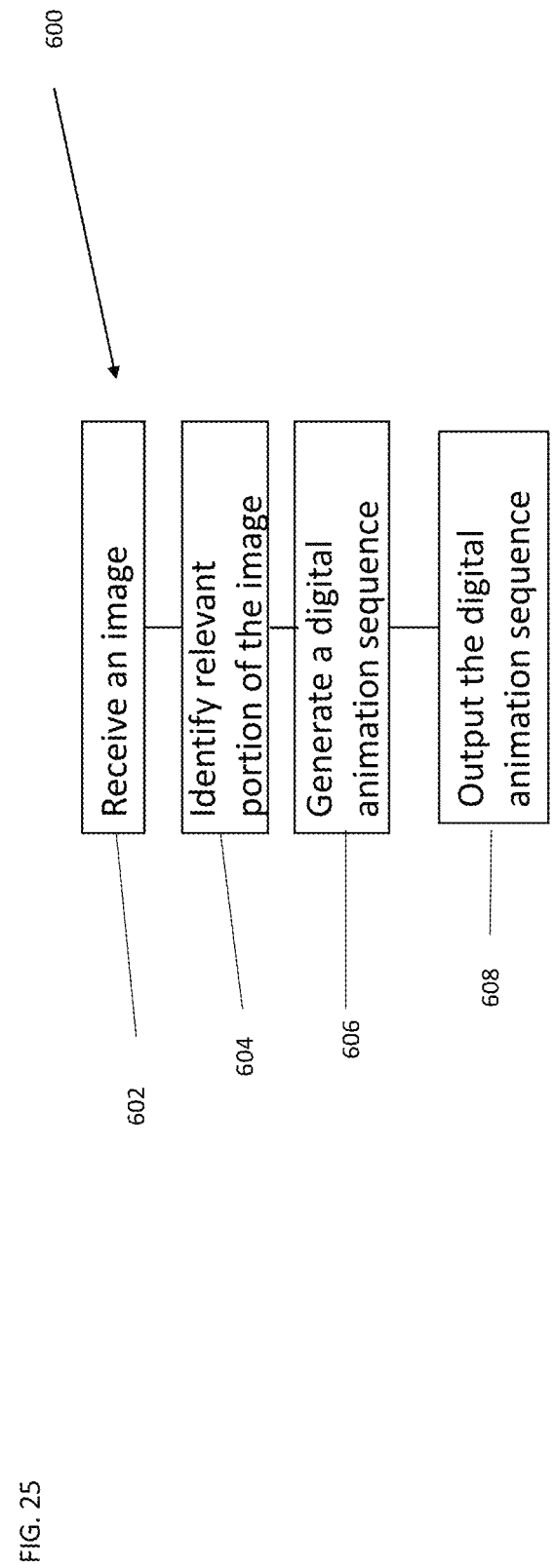
FIG. 25 is a diagram depicting a method of generating an animation, according to one or more embodiments.

In operation and use, the one or more components of the network and/or the server may perform a method of generating a animation from a captured image. With reference to FIG. 25, and generally, the software method 600 may include: (1) receiving an image 602, (2) identifying relevant portions of the image 604, (3) generating a digital animation sequence 606 by normalizing, compositing, and compiling frames, and (4) outputting the digital animation sequence 608.

Depending on which component of the network is processing the image, receiving an image 602 may take one of several forms. For example, where the image processing is being performed on the image capture device, receiving an image 602 may be part and parcel to capturing the image. This may be particularly true where, for example, software for processing the image has image capture software providing the software with the ability to access the camera of a smartphone, for example. Here, the image may be captured while in the software and receiving an image may involve actively capturing the image by the software. In this embodiment, the image may be received by an optical sensor such as the camera to obtain a digital image. Where processing of the image is being performed by a server apart from the image capture device, receiving the image may include receiving a transmission from the image capture device or other device where the image data is included in the communication. As discussed above, the transmission may include short range or long-range communication methods.

Identifying a relevant portion of the image 604 may be performed by the identifier detector 520. The identifier detector 520 may rely on the image itself, information gleaned from a template information feature such as a fiducial, shape, or object. The information gleaned may include the size or shape of the foundation of the template, for example. As stated above, this process be completed by utilizing an identifier detector 520 to detect various indicators comprising a fiducial, a grid, and other forms of indicators. Such other forms of indicators may comprise a predefined value stored in a lookup table, wherein the identifier detector may compare the image to the predefined value to identify various aspects of the received image. Such aspects may include the type of fiducial, grid, or other form of indicator used in the image and how many frames the image contains regardless of whether an identifier is present. For example, the identifier detector 520 may detect the number of juxtaposed content positions present and the content of each position without the use of a fiducial, a grid, or other forms of indicators by comparing the received image to a predetermined value that is similar, or equal, to a template that a user made edits to. By subtracting a raw template as a predetermined value from the edited image completed by a user, the edits from the user may be isolated. The identifier detector then, in turn, may compile the frames of the edits from the user by assuming the location of each frame within the image indicates the order in which the frames should be compiled. For example, the identifier detector may take a grid that is edited with three frames and subtract a predefined value of a three-frame grid that is stored in a lookup table before finally compiling the three frames into an image sequence by assuming the frame on the left-hand side should be displayed first, and other frames should be subsequently displayed as the frames move from left to right in a 1×3 grid. Still other approaches to identifying the relevant portion of the image and the individual portions of content for the animation may be used including scanning for similarities across portions of the image, artificial intelligence techniques or other approaches as discussed in more detail above.

Generating a digital animation sequence 606 may be performed using a normalizer, a compositor, and other processor tools. As stated above, the normalizer may isolate the valuable portion of the received image in step 604 by eliminating noise. The normalizer may further include a perspective tool, a distortion tool, a crop tool, and other tools, wherein the perspective tool may correct the perspective of an image, the distortion tool may change the shapes of drawings within frames to create seamless transitions, and the crop tool may filter out noise from an identified portion of an image as discussed above. The compositor may take the valuable portion of the image that is isolated by the normalizer and create a digital animation from this image by completing a pre-framing compositing process and a post-framing compositing process. The pre-framing compositing steps may include layering a background in front of an image frame, layering a foreground in front of an image frame, or applying visual effects dependent on each frame's chronological placement within an overall sequence. The framing compositing steps may include placing each frame in a desired order by a user within the correct layer of the digital animation. Once the image is normalized and composited through the use of a normalizer and a compositor, the process of creating a digital animation sequence may be completed by performing any other additional desired effects by the user through other processors. Other processors may be used to add additional effects to a composited digital animation sequence. For example, other processors may receive a user input to perform a second compositing step if the user inputs a second set of frames to be composited and wishes for the two sets of frames to be stitched together. Two sets of frames may be stitched together when the last frame of the first set of frames is shown directly before the first frame of the second set of frames with a desired transition. This process of stitching may be repeated for any desired number of sets of frames, wherein the other processors may receive any number of instructions from the user to stitch the sets of frames together while repeating the normalization and compositing steps as discussed above.

Outputting the digital animation sequence 608 may depend again on where the image processing is occurring. For example, if the image processing is performed directly on the image capture device, outputting the digital animation sequence may include storing the image in memory. However, if the image processing is performed on a separate computing device, outputting the digital animation sequence 608 may include transmitting the sequence via local or non-local communication systems. In one or more embodiments, an exporter may comprise a printing agent that allows the animation sequence to be viewed from a memory. The printing agent may comprise a display with icons that allow a user to instruct the processor to perform certain actions with the memory. The display may further comprise a graphical user interface generator and a graphical user interface, wherein the graphical user interface is capable of receiving inputs from a user and exporting outputs, based on the input received from the user to the processor to instruct the processor to perform a specific function within the memory. The exporter may, thus, allow a manager or user of the server to view the animation before sending it back to the user and may provide for editing each of the frames in a photo editor, for example. On the other hand, in cases where the image capture device performs the image processing, the exporter may also be part of the image capture device such that the user is able to view the animation on the image capture device. In one or more embodiments, this may include prompting the user to review/edit individual frames in a photo editor prior to or after generation of the animation. In other embodiments, displaying the animation sequence may rely on other video playback or image display features present on the image capture device.

Figure 26A:
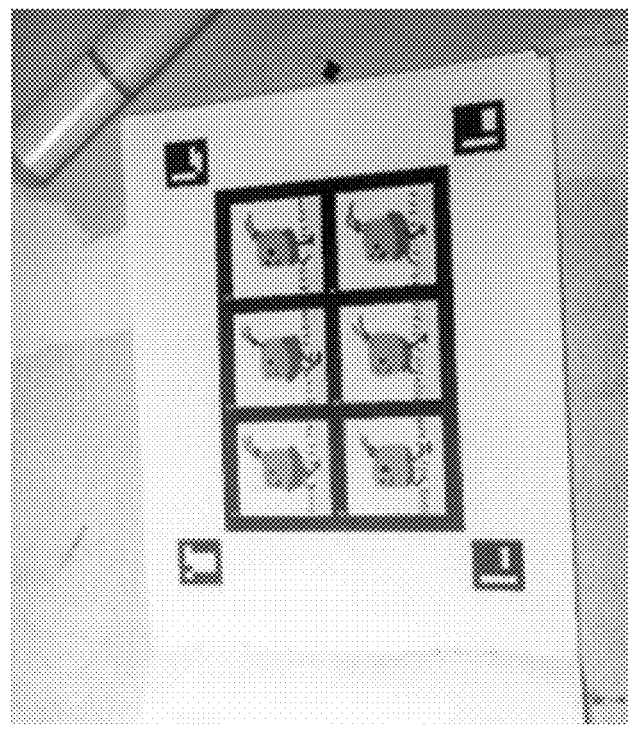
FIG. 26A is an image of an animation template that an animation is being generated from, according to one or more embodiments.
Figure 26B:
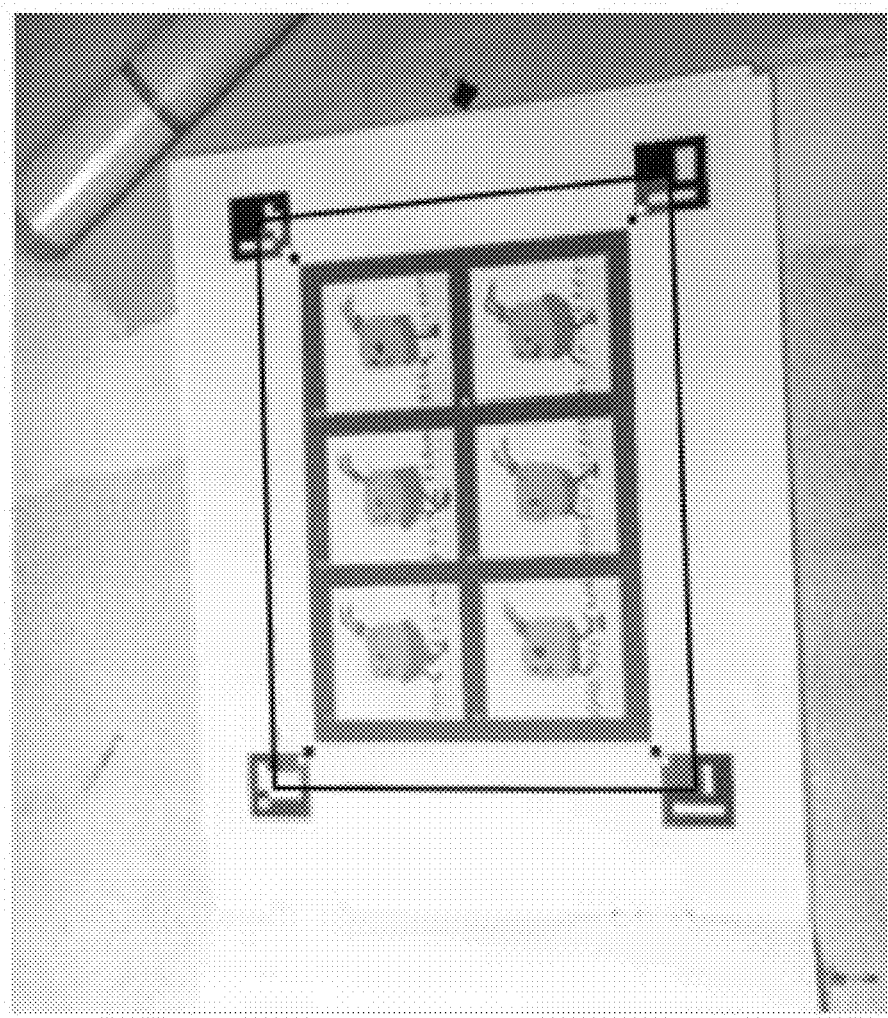
FIG. 26B is an image of an area recognized by a processor as the template having content for an animation, according to one or embodiments.
Figure 26C:
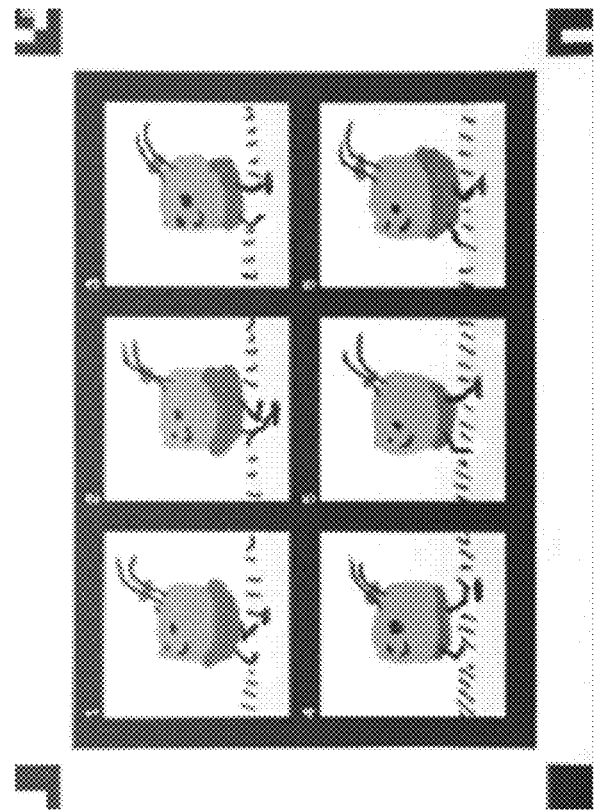
FIG. 26C is a cropped and aligned view thereof.
Figure 26D:
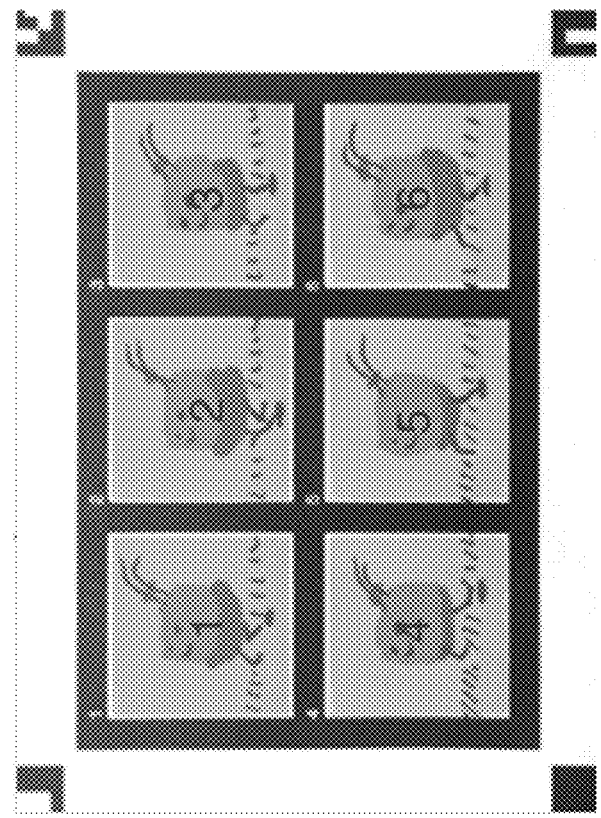
FIG. 26D is an image of the area of the template having animation content depicting the individual six images that will be used for the animation, according to one or more embodiments.
Figure 26E:
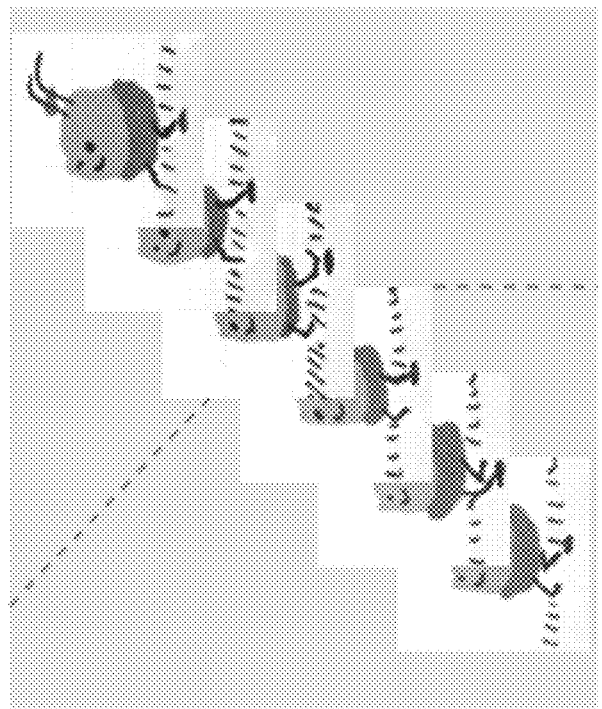
FIG. 26E is an image showing the six animation images separated and ordered, according to one or more embodiments.
Figure 26F:
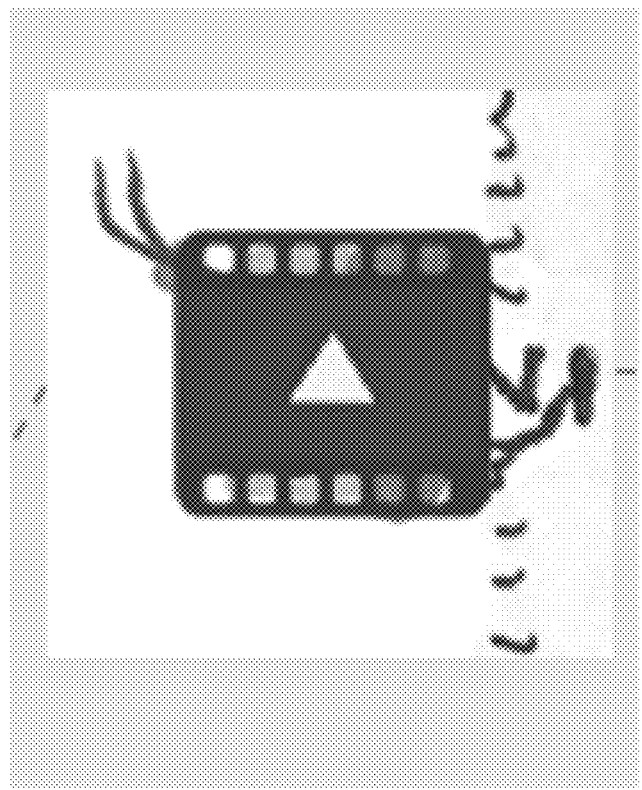
FIG. 26F is an image of the animation displayed on a computing device, according to one or more embodiments.

FIGS. 26A-26F illustrate images associated with the above method of producing an animation. For example, FIG. 26A depicts an image captured by an optical sensor, in this case the camera on a phone, that includes an animation template as well as drawings in each frame of the template. The template in this case is a grid with six cells on a page and four fiducial markers on the outside of the grid at the corners. The drawings in each cell are on the page with the template. The image is then captured of the drawings on the template. FIG. 26B depicts the area recognized by the computer as the location of the template based on the fiducial markers in the image. The fiducial markers allow the computer to locate the template and the drawings within even though the template is slightly rotated with respect to the edges of the image as a whole. The area identified by the computer as the template includes all of the six drawings that were on the page. FIG. 26C depicts the image after the area identified as the animation template has been cropped and aligned. The drawings are still present in the altered image as well as the grid and a portion of the fiducial markers. The surroundings that were captured in the image have been cropped out. The image no longer includes the edge of the paper that the template and drawings were on. FIG. 26D depicts the computer identifying each of the six drawings that were on the template when the image of the page was taken. The area of the drawings is identified to not include the grid that was part of the template. Each of these drawings is also identified as part of a sequence based on its location in the template. The top left drawing is defined as the first in the sequence. The drawing to the right of the first is identified as second, and the right most on the top line is designated third. The three images on the bottom are similarly sequences with the left most starting at fourth and proceeding to the right most drawing being sixth. The location of each drawing is not based on whether there is a drawing present but where a drawing is expected to be. The presence of a different drawing or the absence of a drawing at all does not alter the locations identified as part of the template. FIG. 26E depicts the drawings, or rather the areas expected to contain drawings, individually cropped and aligned one on top of another starting with the drawing or area designated as first based on its location in the template and proceeding in order until all six drawings or areas, which now constitute the frames of an animation, are ordered. FIG. 26F depicts the final compiled video file that is outputted to the artist or user. The final video file contains the frames identified from the image of the template with drawings. Each of the six drawings resulted in one of six frames. The video file, when played, displays each of the frames in sequence at a rate determined by the computer or program. Each frame contained a drawing, so the result is each drawing displayed in quick succession creating an animation composed of the drawings.

FIGS. 27A-27F illustrate another set of images associated with the above method of generating an animation where the template includes still content positions and an auxiliary control feature is also provided on the template. In this example, the template uses a grid without borders on the outside. A fiducial marker at each corner outside of the drawing areas may be available to help the computer identify what the bounds of the template are. The grid and fiducial markers making up the template are on a page where the drawings are also applied before the initial image is taken and sent to a computer or program for processing.

Figure 27A:
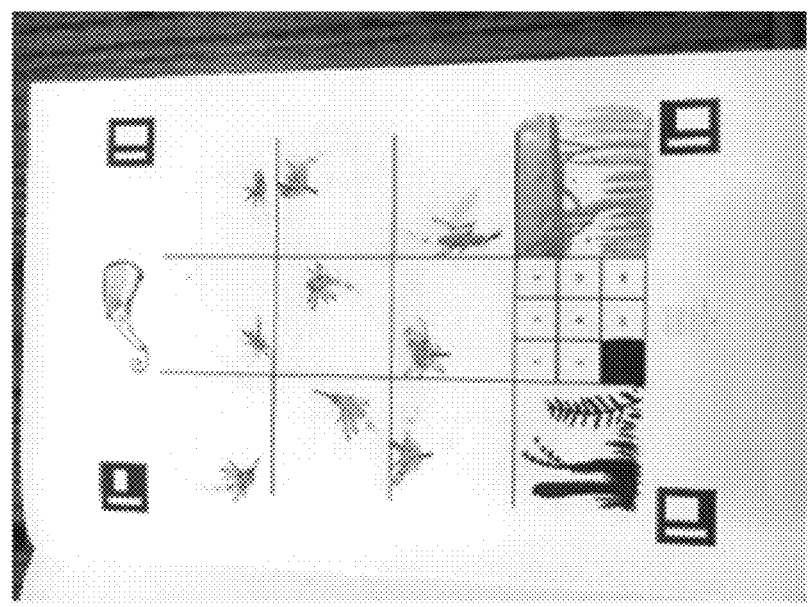
FIG. 27A is an image of an animation template that an animation is being generated from, according to one or more embodiments.

FIG. 27A depicts the initial image sent to the computer or program. The image includes the page containing the animation template as well as the drawings contained in each of the cells of the template. The image also includes some background that is not part of the animation template but was captured by the optical sensor along with the template. This template includes 9 frames for drawings as well as a cell in the grid for drawing a foreground that will be applied to every frame of the animation. Another cell included in the template is a background that will be applied to every frame behind both the foreground and the drawings. The final cell of the grid on the bottom center includes a grid of its own with numbers in each of the cells in this smaller grid. This cell is for selecting the frames per second of the final video file. Of the frames in the smaller grid one is filled in entirely with a dark color. The number in that cell is the selected frame rate in frames per second, or FPS selection.

Figure 27B:
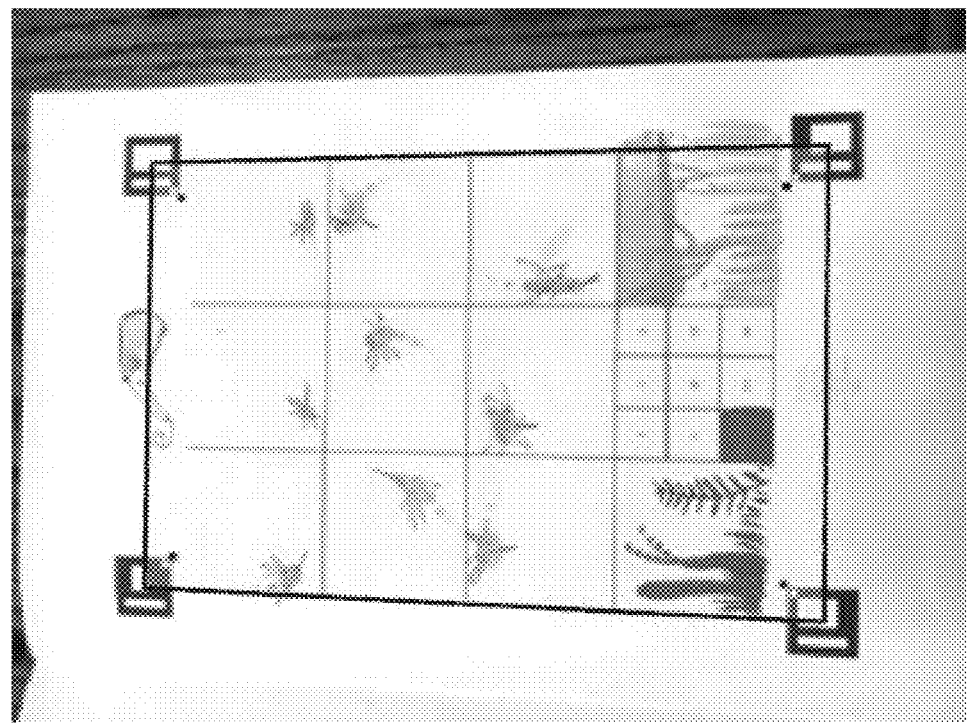
FIG. 27B is an image of an area recognized by a processor as the template having content for an animation, according to one or embodiments.

FIG. 27B depicts the image from 12a with a box identifying where the computer or program has identified the template to be. The area included in the box contains all nine frames of drawings and their drawings as well as the background, foreground, and frame selection cells. The sides of the box identifying the template connect the center points of the fiducial markers in the image. the box excludes mostly white space but also part of the background drawing in the background cell.

Figure 27C:
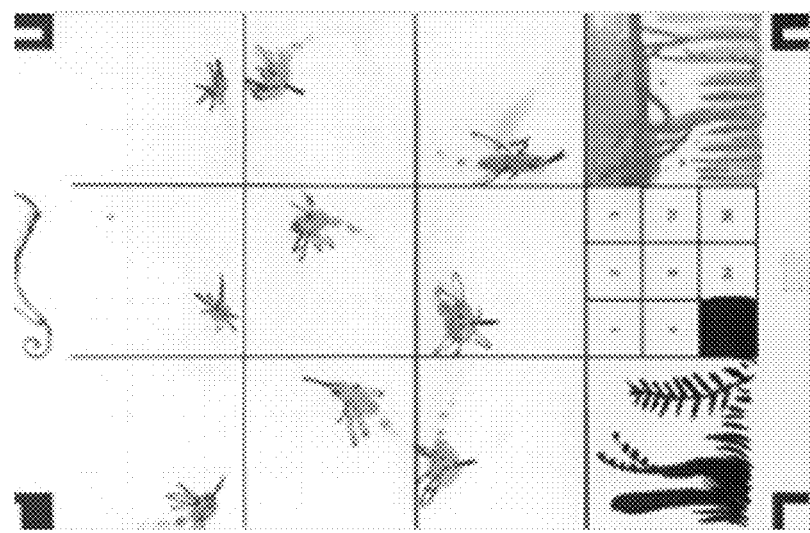
FIG. 27C is a cropped and aligned view thereof.

FIG. 27C depicts the image obtained by the optical sensor but adjusted so the template is the expected shape and cropped to exclude any part of the image not part of the template. The edge of the paper and anything included in the original image that was not part of the template was not included in this image. The nine frames of drawings as well as the foreground, background, and FPS selection are included in this cropped image. The portion of the background drawing that was not included in the area identified by the computer as the template has been cropped out.

Figure 27D:
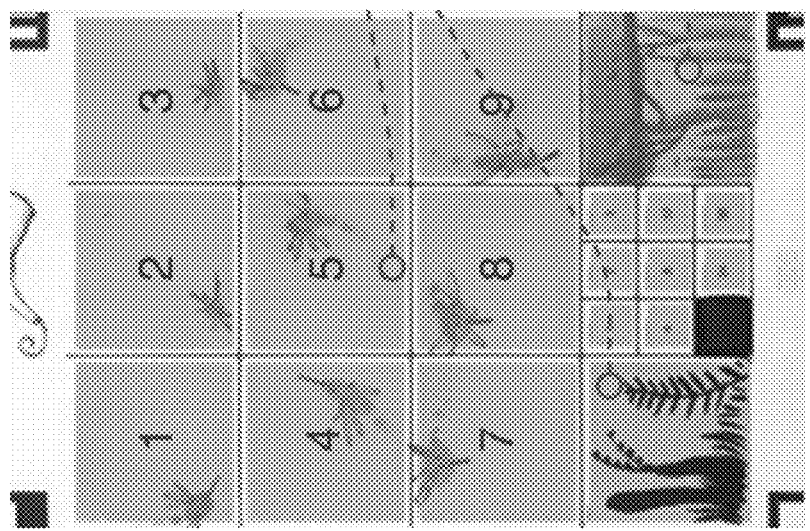
FIG. 27D is an image of the area of the template having animation content depicting the individual nine images that will be used for the animation as well as the foreground, the background, and the selected speed in an auxiliary control feature of the template, according to one or more embodiments.

FIG. 27D depicts the adjusted and cropped image from 12c but displays how the computer divides the image into individual cells. The 9 cells containing drawings are identified and include the area of each cell that will become the frames of the animation as well as where those drawings will be in the order of frames based on their location in the template. The top left cell is identified as one, and the frames proceed from there, left to right, top to bottom, until the top nine frames are numbered. The fore ground and background frames are not identified with numbers. The FPS selection cell is broken up into the smaller grid cells and each sell is checked to see if it is filled in or not. Using this process, the computer or program is able to identify and apply the appropriate frame rate to the final outputted animation.

Figure 27E:
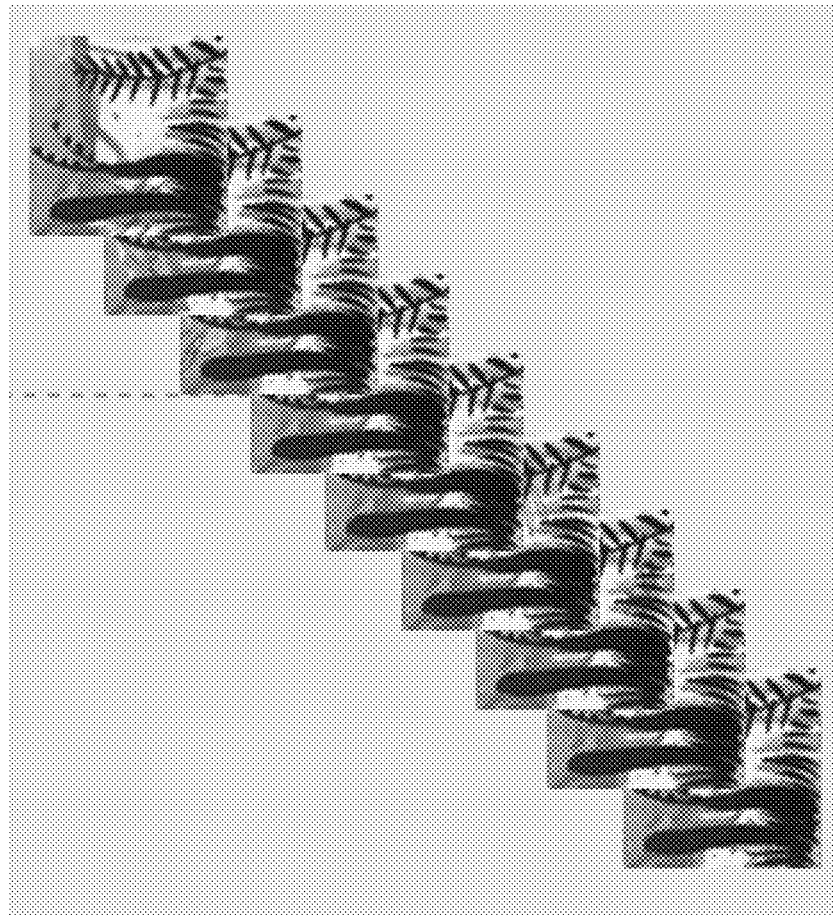
FIG. 27E is an image showing the nine animation images separated and ordered, according to one or more embodiments.

FIG. 27E depicts each frame ordered as it will be in the final animation. Each frame consists of the background the foreground and the appropriately ordered drawing for the frame. The first frame, for example includes the background, the drawing from the cell in the template designated first layered on top of it, and the foreground layered on top of that. Similar to the portion of the background drawing that was cropped out in a previous step, any part of the drawings that was not within the shaded area of the previous figure has been cropped out and not included in these frames because the computer or program is not identifying the drawing, but an area where the drawing is expected to be.

Figure 27F:
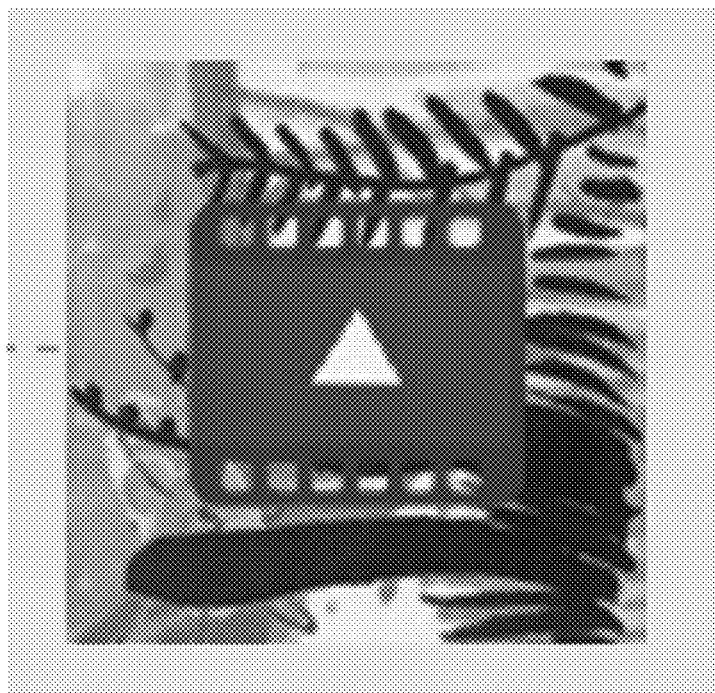
FIG. 27F is an image of the animation displayed on a computing device, according to one or more embodiments.

FIG. 27F depicts the final video file outputted to the artist or user. The video file, when played, displays each frame in sequence at the frame rate selected on the template. The foreground and background appear to remain constant because each has been applied to every frame in the appropriate layer. The drawings form the moving component of the animation which appears to move in front of the background and behind the foreground.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An animation template, comprising:
   a substrate configured for receiving progressively changing illustrations from a user;
   a foundation arranged on the substrate and identifying a series of juxtaposed active content positions, wherein:
      each active content position is configured to inform a user of a location where one of the progressively changing illustrations for a particular frame of an animation should be created by the user; and
      a position of each active content position relative to other of the active content positions represents a timewise frame position where the one of the progressively changing illustrations will appear in a resulting animation relative to other of the progressively changing illustrations; and
   a template information feature arranged on the substrate and configured for providing template information to a computing system.

2. The template of claim 1, further comprising an auxiliary control feature configured to allow a user to provide presentation information to the computing system.

3. The template of claim 2, wherein the presentation information is speed.

4. The template of claim 2, wherein the auxiliary control feature includes a series of selection options.

5. The template of claim 1, wherein the foundation further defines at least one still content position configured to guide a user in the spatial placement of still content.

6. The template of claim 1, wherein the template information feature comprises a fiducial.

7. The template of claim 6, wherein the fiducial is configured to convey data.

8. The template of claim 7, wherein the data defines a template type.

9. The template of claim 7, wherein the data comprises a location of an auxiliary control feature configured to allow a user to provide presentation information to the computing system.

10. The template of claim 7, wherein the data includes a location and type of a still position.

11. The template of claim 1, further comprising guidance content in the series of juxtaposed active content positions.

12. A user method of creating an animation using a template, the method comprising:
- a user receiving or selecting a template having a series of juxtaposed active content positions for receiving progressively changing illustrations;
- the user creating the progressively changing illustrations in the series of juxtaposed active content positions resulting in a completed template;
- the user capturing an image of the completed template;
- the user directing processing of the image to generate a resulting animation wherein the processing divides and arranges in time the progressively changing illustrations based on the arrangement of their respective active content positions; and
- the user running and viewing the resulting animation.

13. The method of claim 12 further comprising indicating a control setting via an auxiliary control feature of the template.

14. The method of claim 13, wherein indicating a control setting comprises selecting a speed.

15. The method of claim 14, wherein indicating a control setting comprises selecting a visual effect.

16. The method of claim 12, wherein the template comprises at least one still content position, the method further comprising providing still content in the at least one still content position.

17. The method of claim 12, wherein the template provides guidance content and creating the progressively changing illustrations comprises providing content according to the guidance.

18. A computer method for generating an animation based on a user-completed template, the method comprising:
- receiving an image of the user-completed template, the user-completed template having a foundation defining a spatial placement of a series of juxtaposed active content positions, the series of juxtaposed active content positions having progressively changing illustrations for each frame of an animation arranged therein and provided by a user;
- detecting an identifier within the image using an identifier detector and using the identifier to define a boundary of a portion of the image to be used to generate an animation;
- processing the image with a compiler, to compile an animation by arranging, in time, the progressively changing illustrations based on the spatial placement of their respective active content positions; and
- outputting the compiled animation.

19. The method of claim 18, wherein receiving an image comprises receiving no more than a single image.

* * * * *